US012604204B2

(12) United States Patent
Syed et al.

(10) Patent No.: US 12,604,204 B2
(45) Date of Patent: Apr. 14, 2026

(54) APPARATUS AND METHODS FOR HETEROGENEOUS COVERAGE AND USE CASES IN A QUASI-LICENSED WIRELESS SYSTEM

(71) Applicant: Charter Communications Operating, LLC, St. Louis, MO (US)

(72) Inventors: Haider H. Syed, Parker, CO (US); Perwaiz Akhtar, Aurora, CO (US); Saran Khalid, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 584 days.

(21) Appl. No.: 17/901,500

(22) Filed: Sep. 1, 2022

(65) Prior Publication Data

US 2022/0417764 A1     Dec. 29, 2022

Related U.S. Application Data

(62) Division of application No. 16/927,781, filed on Jul. 13, 2020, now Pat. No. 11,438,771.
(Continued)

(51) Int. Cl.
*H04W 16/14* (2009.01)
*H04W 16/28* (2009.01)
(Continued)

(52) U.S. Cl.
CPC ........... *H04W 16/14* (2013.01); *H04W 16/28* (2013.01); *H04W 72/04* (2013.01); *H04W 88/08* (2013.01)

(58) Field of Classification Search
CPC .............................. H04W 16/14; H04W 24/02
See application file for complete search history.

(56) References Cited

U.S. PATENT DOCUMENTS 5,912,646 A     6/1999   Seki et al.
5,991,308 A    11/1999   Fuhrmann et al.
(Continued)

FOREIGN PATENT DOCUMENTS

CA     3114660 A1     4/2020
EP     2294860 A1     3/2011
(Continued)

OTHER PUBLICATIONS

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.
(Continued)

*Primary Examiner* — Shukri Taha
(74) *Attorney, Agent, or Firm* — Patent Beach PC

(57) ABSTRACT

Apparatus and methods for providing multi-tier quasi-licensed spectrum service via a common wireless access node. In one embodiment, the quasi-licensed system utilizes 3.55-3.70 GHz CBRS (Citizens Broadband Radio Service) GAA and PAL spectrum selectively applied to first and second transceiver chains (including one or more antenna elements each) of the wireless access node. In one variant, GAA spectrum is used for unlicensed and unrestricted user access within an indoor portion of a premises, while PAL is used for licensed and restricted use in an outdoor area of/external to the premises.

20 Claims, 19 Drawing Sheets

Related U.S. Application Data

(60) Provisional application No. 62/873,141, filed on Jul. 11, 2019.

(51) Int. Cl.
| | |
|---|---|
| *H04W 72/04* | (2023.01) |
| *H04W 88/08* | (2009.01) |

(56) References Cited

U.S. PATENT DOCUMENTS

| | | | |
|---|---|---|---|
| 5,995,499 | A | 11/1999 | Hottinen et al. |
| 6,088,003 | A | 7/2000 | Bassirat |
| 6,127,972 | A | 10/2000 | Avidor et al. |
| 6,154,648 | A | 11/2000 | Comer |
| 6,192,038 | B1 | 2/2001 | Wallerius et al. |
| 6,356,560 | B1 | 3/2002 | Venters et al. |
| 6,745,051 | B1 | 6/2004 | Bassirat |
| 6,771,953 | B1 | 8/2004 | Chow et al. |
| 6,782,262 | B1 | 8/2004 | Lundborg |
| 6,933,900 | B2 | 8/2005 | Kitamori et al. |
| 7,002,518 | B2 | 2/2006 | Lin et al. |
| 7,218,286 | B2 | 5/2007 | Munk |
| 7,266,726 | B1 | 9/2007 | Ladd et al. |
| 7,397,425 | B2 | 7/2008 | Ranta et al. |
| 7,573,819 | B2 | 8/2009 | Krzanowski et al. |
| 7,592,912 | B2 | 9/2009 | Hasek et al. |
| 7,602,820 | B2 | 10/2009 | Helms et al. |
| 7,643,794 | B2 | 1/2010 | Ofek et al. |
| 7,656,364 | B2 | 2/2010 | Masini |
| 7,698,606 | B2 | 4/2010 | Ladd et al. |
| 7,724,200 | B2 | 5/2010 | Kitamori et al. |
| 7,978,144 | B2 | 7/2011 | Tanabe et al. |
| 8,024,607 | B2 | 9/2011 | Ladd et al. |
| 8,046,636 | B2 | 10/2011 | Ladd et al. |
| 8,095,610 | B2 | 1/2012 | Gould et al. |
| 8,170,065 | B2 | 5/2012 | Hasek et al. |
| 8,189,465 | B1 | 5/2012 | Pawar et al. |
| 8,218,422 | B2 | 7/2012 | Venturino et al. |
| 8,237,619 | B2 | 8/2012 | Vassilakis et al. |
| RE43,760 | E | 10/2012 | Abel et al. |
| 8,302,111 | B2 | 10/2012 | Ladd et al. |
| 8,321,723 | B2 | 11/2012 | Ladd et al. |
| 8,405,567 | B2 | 3/2013 | Park et al. |
| 8,452,319 | B2 | 5/2013 | Lee et al. |
| 8,718,100 | B2 | 5/2014 | Markley et al. |
| 8,799,723 | B2 | 8/2014 | Ladd et al. |
| 8,958,810 | B2 | 2/2015 | Buddhikot et al. |
| 8,997,136 | B2 | 3/2015 | Brooks et al. |
| 9,166,891 | B2 | 10/2015 | Hu et al. |
| 9,185,341 | B2 | 11/2015 | Hardin |
| 9,213,538 | B1 | 12/2015 | Ladd et al. |
| 9,232,558 | B1 | 1/2016 | Tinoco et al. |
| 9,258,809 | B2 | 2/2016 | Liao et al. |
| 9,264,751 | B2 | 2/2016 | Sarosi et al. |
| 9,300,445 | B2 | 3/2016 | Hardin |
| 9,368,880 | B2 | 6/2016 | Solondz |
| 9,386,496 | B2 | 7/2016 | Gupta et al. |
| 9,413,651 | B2 | 8/2016 | Tsym et al. |
| 9,414,111 | B2 | 8/2016 | Hasek et al. |
| 9,472,091 | B2 | 10/2016 | Stern et al. |
| 9,473,957 | B2 | 10/2016 | Wellington |
| 9,479,404 | B2 | 10/2016 | Ladd et al. |
| 9,526,056 | B2 | 12/2016 | Tomici et al. |
| 9,564,932 | B1 | 2/2017 | Pack et al. |
| 9,578,519 | B2 | 2/2017 | Jaldén et al. |
| 9,591,491 | B2 | 3/2017 | Tapia et al. |
| 9,612,816 | B2 | 4/2017 | Choi et al. |
| 9,654,149 | B2 | 5/2017 | Piipponen et al. |
| 9,699,663 | B1 | 7/2017 | Jovancevic |
| 9,729,423 | B1 | 8/2017 | Tinoco et al. |
| 9,730,135 | B1 | 8/2017 | Rahman |
| 9,730,143 | B2 | 8/2017 | Gormley et al. |
| 9,769,692 | B2 | 9/2017 | Freda et al. |
| 9,807,778 | B2 | 10/2017 | Ma et al. |
| 9,813,148 | B2 | 11/2017 | Syed et al. |
| 9,831,548 | B2 | 11/2017 | Timofeev et al. |
| 9,882,612 | B2 | 1/2018 | Da Silveira et al. |
| 9,887,864 | B1 | 2/2018 | Han et al. |
| 10,003,548 | B2 | 6/2018 | Lee et al. |
| 10,033,505 | B2 | 7/2018 | Malladi et al. |
| 10,098,568 | B2 | 10/2018 | Gazdzinski |
| 10,135,730 | B2 | 11/2018 | Chou |
| 10,149,327 | B2 | 12/2018 | Au et al. |
| 10,164,858 | B2 | 12/2018 | Gunasekara et al. |
| 10,193,236 | B1 | 1/2019 | Lee et al. |
| 10,269,229 | B2 | 4/2019 | Stern et al. |
| 10,271,351 | B1 | 4/2019 | Wang |
| 10,340,976 | B2 | 7/2019 | Kakinada et al. |
| 10,405,192 | B2 | 9/2019 | Kakinada et al. |
| 10,419,943 | B1 * | 9/2019 | Wong .................. H04W 16/32 |
| 10,484,876 | B2 | 11/2019 | Shah et al. |
| 10,492,204 | B2 | 11/2019 | Kakinada et al. |
| 10,499,409 | B2 | 12/2019 | Shattil |
| 10,506,456 | B2 | 12/2019 | Lou et al. |
| 10,531,309 | B1 | 1/2020 | Li et al. |
| 10,536,858 | B2 | 1/2020 | Zapanta et al. |
| 10,536,859 | B2 | 1/2020 | Gunasekara et al. |
| 10,624,079 | B2 | 4/2020 | Xu et al. |
| 10,680,883 | B2 | 6/2020 | Hall et al. |
| 10,750,462 | B2 | 8/2020 | Kadambar et al. |
| 10,805,562 | B2 | 10/2020 | Nakamura et al. |
| 10,945,250 | B2 | 3/2021 | Kwon et al. |
| 10,966,073 | B2 | 3/2021 | Petersen |
| 10,979,768 | B2 | 4/2021 | Sarosi et al. |
| 10,980,025 | B2 | 4/2021 | Hmimy et al. |
| 10,991,227 | B2 | 4/2021 | Stern et al. |
| 11,026,205 | B2 | 6/2021 | Hmimy et al. |
| 11,129,171 | B2 | 9/2021 | Hmimy |
| 11,190,861 | B2 | 11/2021 | Bali |
| 11,219,026 | B2 | 1/2022 | Kakinada et al. |
| 11,317,296 | B2 | 4/2022 | Vaidya et al. |
| 11,363,466 | B2 | 6/2022 | Khalid et al. |
| 11,432,284 | B2 | 8/2022 | Hmimy et al. |
| 11,438,771 | B2 | 9/2022 | Syed et al. |
| 11,457,485 | B2 | 9/2022 | Khalid et al. |
| 11,523,306 | B1 * | 12/2022 | Chu .................... H04L 69/324 |
| 11,564,249 | B2 | 1/2023 | Talarico et al. |
| 11,979,809 | B2 | 5/2024 | Petersen |
| 12,009,885 | B2 | 6/2024 | Murakami |
| 12,170,986 | B2 | 12/2024 | Hmimy et al. |
| 12,231,248 | B2 | 2/2025 | Fehrenbach et al. |
| 2002/0122040 | A1 | 9/2002 | Noyle |
| 2002/0126748 | A1 | 9/2002 | Rafie et al. |
| 2003/0158906 | A1 | 8/2003 | Hayes |
| 2004/0001021 | A1 | 1/2004 | Choo et al. |
| 2004/0187150 | A1 | 9/2004 | Gonder et al. |
| 2004/0196834 | A1 | 10/2004 | Ofek et al. |
| 2004/0230754 | A1 | 11/2004 | Gumm et al. |
| 2006/0188004 | A1 | 8/2006 | Kizu et al. |
| 2007/0022459 | A1 | 1/2007 | Gaebel, Jr. et al. |
| 2007/0094691 | A1 | 4/2007 | Gazdzinski |
| 2008/0010506 | A1 | 1/2008 | Tabei et al. |
| 2008/0097913 | A1 | 4/2008 | Dicks et al. |
| 2008/0126540 | A1 | 5/2008 | Zeng et al. |
| 2008/0220786 | A1 | 9/2008 | Beacham |
| 2008/0220788 | A1 | 9/2008 | Stanwood et al. |
| 2008/0235746 | A1 | 9/2008 | Peters et al. |
| 2009/0028182 | A1 | 1/2009 | Brooks et al. |
| 2009/0034443 | A1 | 2/2009 | Walker et al. |
| 2009/0129273 | A1 | 5/2009 | Zou |
| 2009/0170472 | A1 | 7/2009 | Chapin et al. |
| 2009/0253438 | A1 | 10/2009 | Chater-Lea et al. |
| 2009/0323516 | A1 | 12/2009 | Bhagwan et al. |
| 2010/0035611 | A1 | 2/2010 | Montojo et al. |
| 2010/0094956 | A1 | 4/2010 | Zuckerman et al. |
| 2010/0128608 | A1 | 5/2010 | Zou et al. |
| 2010/0234042 | A1 | 9/2010 | Chan et al. |
| 2010/0262722 | A1 | 10/2010 | Vauthier et al. |
| 2010/0309806 | A1 | 12/2010 | Wu et al. |
| 2011/0014924 | A1 | 1/2011 | Hwang et al. |
| 2011/0292970 | A1 | 12/2011 | Lansford et al. |
| 2012/0188877 | A1 | 7/2012 | Chin et al. |
| 2013/0007413 | A1 | 1/2013 | Thomson et al. |
| 2013/0039200 | A1 | 2/2013 | Park et al. |

(56)        References Cited

U.S. PATENT DOCUMENTS

| 2013/0122903 A1 | 5/2013 | Farnsworth et al. |
| 2013/0182602 A1 | 7/2013 | Lee et al. |
| 2013/0279376 A1 | 10/2013 | Ahmadi |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0035182 A1 | 2/2014 | Boyer et al. |
| 2014/0106672 A1 | 4/2014 | Jeon et al. |
| 2014/0194068 A1 | 7/2014 | Coppage et al. |
| 2014/0199991 A1 | 7/2014 | Mukherjee et al. |
| 2014/0215457 A1 | 7/2014 | Gava et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0058861 A1 | 2/2015 | Zheng et al. |
| 2015/0071239 A1 | 3/2015 | Zhang et al. |
| 2015/0133173 A1 | 5/2015 | Edge et al. |
| 2015/0139175 A1 | 5/2015 | Ratasuk et al. |
| 2015/0156095 A1 | 6/2015 | Lu |
| 2015/0181546 A1 | 6/2015 | Freda et al. |
| 2015/0181589 A1 | 6/2015 | Luo et al. |
| 2015/0189609 A1 | 7/2015 | Zhang et al. |
| 2015/0208262 A1 | 7/2015 | Siomina |
| 2015/0280847 A1 | 10/2015 | Somasundaram et al. |
| 2015/0304856 A1 | 10/2015 | Garcia et al. |
| 2015/0334664 A1 | 11/2015 | Sawai et al. |
| 2015/0341753 A1 | 11/2015 | Chen et al. |
| 2015/0358968 A1* | 12/2015 | Malladi ................. H04W 16/14 455/454 |
| 2016/0007147 A1 | 1/2016 | Zhang et al. |
| 2016/0021661 A1 | 1/2016 | Yerramalli et al. |
| 2016/0073259 A1 | 3/2016 | Lee et al. |
| 2016/0127185 A1 | 5/2016 | McAllister |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0249350 A1 | 8/2016 | Koutsimanis et al. |
| 2016/0269978 A1 | 9/2016 | Bashar et al. |
| 2016/0330743 A1 | 11/2016 | Das et al. |
| 2016/0353367 A1 | 12/2016 | Vrzic et al. |
| 2016/0381600 A1 | 12/2016 | Aksu |
| 2017/0013422 A1 | 1/2017 | Saiwai et al. |
| 2017/0013479 A1 | 1/2017 | Sun et al. |
| 2017/0026203 A1 | 1/2017 | Thomas et al. |
| 2017/0104644 A1 | 4/2017 | Ladd et al. |
| 2017/0150523 A1 | 5/2017 | Patel et al. |
| 2017/0155703 A1 | 6/2017 | Hao et al. |
| 2017/0164326 A1 | 6/2017 | Worrall |
| 2017/0188241 A1 | 6/2017 | Mueck et al. |
| 2017/0208540 A1 | 7/2017 | Egner et al. |
| 2017/0208560 A1 | 7/2017 | Papa et al. |
| 2017/0237767 A1 | 8/2017 | George et al. |
| 2017/0257750 A1 | 9/2017 | Gunasekara et al. |
| 2017/0272955 A1 | 9/2017 | Sadek et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2017/0325251 A1 | 11/2017 | Sadek |
| 2017/0332357 A1 | 11/2017 | Xu et al. |
| 2017/0359731 A1 | 12/2017 | Soldati et al. |
| 2018/0007587 A1 | 1/2018 | Feldman et al. |
| 2018/0035463 A1 | 2/2018 | Mallik et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0107577 A1 | 4/2018 | Johnsson et al. |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0324722 A1 | 11/2018 | Vos et al. |
| 2018/0343567 A1 | 11/2018 | Ashrafi |
| 2018/0352386 A1 | 12/2018 | Gunasekara et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0037605 A1 | 1/2019 | Agiwal et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0115950 A1 | 4/2019 | Kakinada et al. |
| 2019/0120969 A1* | 4/2019 | Hamzeh ................. G01S 19/21 |
| 2019/0132882 A1 | 5/2019 | Li et al. |
| 2019/0141723 A1 | 5/2019 | Zhang et al. |
| 2019/0150182 A1 | 5/2019 | Koorapaty et al. |
| 2019/0150190 A1 | 5/2019 | Kim et al. |
| 2019/0159254 A1 | 5/2019 | Garde et al. |
| 2019/0174546 A1 | 6/2019 | Jeon et al. |
| 2019/0182895 A1 | 6/2019 | Di Girolamo et al. |
| 2019/0222266 A1 | 7/2019 | Cui et al. |
| 2019/0223025 A1* | 7/2019 | Kakinada .......... H04W 72/0453 |
| 2019/0223180 A1 | 7/2019 | Fehrenbach et al. |
| 2019/0230613 A1 | 7/2019 | Kim et al. |
| 2019/0230706 A1 | 7/2019 | Li et al. |
| 2019/0239190 A1 | 8/2019 | Patel et al. |
| 2019/0253878 A1 | 8/2019 | Yu et al. |
| 2019/0254094 A1 | 8/2019 | Babu et al. |
| 2019/0289470 A1 | 9/2019 | Vaidya et al. |
| 2019/0296789 A1 | 9/2019 | Yu et al. |
| 2019/0319699 A1 | 10/2019 | Lee et al. |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320490 A1 | 10/2019 | Liu et al. |
| 2019/0320494 A1 | 10/2019 | Jayawardene et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0387413 A1 | 12/2019 | Wong et al. |
| 2019/0387515 A1 | 12/2019 | Stauffer et al. |
| 2019/0393926 A1 | 12/2019 | Kakinada et al. |
| 2019/0394790 A1 | 12/2019 | Damnjanovic et al. |
| 2019/0394791 A1 | 12/2019 | Brueck et al. |
| 2020/0014693 A1 | 1/2020 | Frederick et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0059931 A1* | 2/2020 | Hannan ............ H04W 72/0453 |
| 2020/0068617 A1 | 2/2020 | Yoon et al. |
| 2020/0083892 A1 | 3/2020 | Kundu et al. |
| 2020/0084759 A1 | 3/2020 | Liu et al. |
| 2020/0137806 A1 | 4/2020 | Islam et al. |
| 2020/0146058 A1 | 5/2020 | Xu et al. |
| 2020/0178237 A1 | 6/2020 | Kakinada et al. |
| 2020/0187150 A1 | 6/2020 | Eisner |
| 2020/0221392 A1 | 7/2020 | Xue et al. |
| 2020/0228993 A1 | 7/2020 | Gunasekara et al. |
| 2020/0252933 A1 | 8/2020 | Hmimy et al. |
| 2020/0275457 A1 | 8/2020 | Hmimy |
| 2020/0288523 A1 | 9/2020 | Patil et al. |
| 2020/0296627 A1 | 9/2020 | Arvidson et al. |
| 2020/0305159 A1* | 9/2020 | Raghothaman ... H04W 72/0453 |

(56)  References Cited

U.S. PATENT DOCUMENTS

| | | |
|---|---|---|
| 2020/0313838 A1 | 10/2020 | Jin et al. |
| 2020/0337054 A1 | 10/2020 | Kwok et al. |
| 2020/0344515 A1 | 10/2020 | Wong et al. |
| 2020/0412565 A1 | 12/2020 | Sanders et al. |
| 2021/0014693 A1 | 1/2021 | Syed et al. |
| 2021/0026711 A1 | 1/2021 | Ovadia et al. |
| 2021/0037444 A1 | 2/2021 | Harel |
| 2021/0051653 A1 | 2/2021 | Park et al. |
| 2021/0058863 A1 | 2/2021 | Kalhan |
| 2021/0076424 A1 | 3/2021 | Mukherjee et al. |
| 2021/0126662 A1 | 4/2021 | Solichien |
| 2021/0127423 A1 | 4/2021 | Park et al. |
| 2021/0167883 A1 | 6/2021 | Yoon |
| 2021/0204322 A1 | 7/2021 | Lou et al. |
| 2021/0211887 A1 | 7/2021 | Jones |
| 2021/0219303 A1 | 7/2021 | Khalid et al. |
| 2021/0235495 A1 | 7/2021 | Xu et al. |
| 2021/0266914 A1 | 8/2021 | Yoo et al. |
| 2021/0274506 A1 | 9/2021 | Raghavan et al. |
| 2021/0345411 A1 | 11/2021 | Li et al. |
| 2021/0376905 A1 | 12/2021 | Zhou et al. |
| 2022/0007200 A1 | 1/2022 | Sevindik et al. |
| 2022/0007374 A1 | 1/2022 | Sevindik et al. |
| 2022/0078804 A1 | 3/2022 | Hmimy |
| 2022/0132524 A1 | 4/2022 | Mueck et al. |
| 2022/0167176 A1 | 5/2022 | Khalid |
| 2022/0183093 A1 | 6/2022 | Sevindik et al. |
| 2022/0191675 A1 | 6/2022 | Mukherjee |
| 2023/0012713 A1 | 1/2023 | Khalid et al. |

FOREIGN PATENT DOCUMENTS

| | | | | |
|---|---|---|---|---|
| EP | 2294860 | B1 | 4/2017 | |
| EP | 3360382 | B1 | 7/2021 | |
| GB | 2585394 | A | 1/2021 | |
| KR | 20140070528 | A | 6/2014 | |
| WO | WO-0130494 | A1 | 5/2001 | |
| WO | WO-0186294 | A1 | 11/2001 | |
| WO | WO-2005065198 | A2 | 7/2005 | |
| WO | WO-2013020599 | A1 | 2/2013 | |
| WO | WO-2017130494 | A1 | 8/2017 | |
| WO | WO-2017186294 | A1 | 11/2017 | |
| WO | WO-2017195078 | A1 | 11/2017 | |
| WO | WO-2018144976 | A2 | 8/2018 | |
| WO | WO-2019067120 | A1 * | 4/2019 | ............ H04W 16/06 |
| WO | WO-2019132980 | A1 | 7/2019 | |
| WO | WO-2019139691 | A1 | 7/2019 | |
| WO | WO-2019199784 | A3 | 11/2019 | |
| WO | WO-2020167222 | A2 | 8/2020 | |

OTHER PUBLICATIONS

Souryal, Michael R., et al., "Effect of Federal Incumbent Activity on CBRS Commercial Service", International Symposium on Dynamic Spectrum Access Networks (DySPAN), IEEE 2019, 5 pages.
Kulacz, Lukasz, et al., "Coordinated Spectrum Allocation and Co existence Management in C8RS-SAS Wireless Networks." IEEE Access 07, pp. 139294-139316. (Year: 2019).

* cited by examiner

500

APPARATUS AND METHODS FOR HETEROGENEOUS COVERAGE AND USE CASES IN A QUASI-LICENSED WIRELESS SYSTEM

PRIORITY

This application is a divisional of and claims priority to co-owned and co-pending U.S. patent application Ser. No. 16/927,781 of the same title filed Jul. 13, 2020, and issuing as U.S. Pat. No. 11,438,771 on Sep. 6, 2022, which claims priority to U.S. Provisional Patent Application Ser. No. 62/873,141 filed Jul. 11, 2019 and entitled "APPARATUS AND METHODS FOR HETEROGENEOUS COVERAGE AND USE CASES IN A QUASI-LICENSED WIRELESS SYSTEM," each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to apparatus and methods for utilizing and assigning radio frequency spectrum, such as for example those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA + up to 21 Mbit/s). |
| | 1900 MHz PCS, Band 2 (UMTS/HSPA + up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |

TABLE 2-continued

| Frequency range | Type | Center frequency | Availability | Licensed users |
|---|---|---|---|---|
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS).

CBSDs (Citizens Broadband Radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin or corresponding to UE) have 23 dBm EIRP (0.2 Watts)/10 MHz requirements, and mobility of the terminals is allowed.

In terms of spectral access, CBRS utilizes a time division duplex (TDD) multiple access architecture.

Omni- and Multi-Sector Antenna Technology

Extant CBRS architectures typically use omni-directional antennas. Traditional omni-directional antennas uniformly radiate power in all directions in the horizontal (azimuth) plane. However, this not an effective coverage solution in many cases, due to often limited footprint, and the antenna being prone to interference (thereby degrading overall network performance). Specifically, one disadvantage of using an omni-directional antenna is that the interference is received from all directions which could degrade the system performance.

Alternatively, directional multi-sector antennas are a promising technology in wireless networks. A multi-sector antenna divides a 360 degrees horizontal plane (or other coverage arc) into N smaller segments. The multi-sector antenna generally radiates power in each sector in a particular angle optimized for that sector. This directional and concentrated power radiation in each sector increases the directional gain of the antenna, and reduces the effects of interference. Therefore, the multisector antennas are more efficient than omni-directional antennas in this regard. The directional power radiation is typically adjustable such as e.g., by using software defined radio and multiple antennas. Multi-Sector antennas provide a means of increasing cellular network capacity and coverage without using additional frequency spectrum. High-order sectorization is particularly used for cost-effective hotspots. In these hotspot areas multiple antennas with narrow bandwidth and high directivity gain can be used to increase the overall capacity. For instance, one sector of the cell may be used to serve part of a cell that has higher traffic, while an overlapping larger sector may be used to serve in the part of the cell that has lower traffic.

Switched-beam antenna technology is often used in multi-sector antenna deployments. In switched-beam antennas, the base station measures the received signal strength, and based on signal strength chooses one of several pre-defined fixed-beam. Switched-beam antennas combine the output of multiple antennas in such a way to form a more finely sectorized directional beam than can be achieved in single sector antenna system.

So-called "smart" antennas are another technology used in multi-sector antenna systems. The smart antennas use multiple antennas to shape the beam pattern. The smart antennas use the space dimension, sometimes referred to space diversity, to provide control over space and create the desired beam shape. Flexibility and control over the beam shape is achieved through the beamforming process by altering the amplitude and phase of the radiated signals from the individual antenna elements. Smart antennas provide maximum power in the desired direction through steering the main beam in a chosen angle, while nulls can be steered in the direction of interferers.

Despite the foregoing, current omni-directional and multi-sector antenna and associated base station configurations are not well adapted to certain use cases, including those anticipated for certain consumers or end-customers. For example, small and medium business customers) typically experience high traffic during business hours. Such businesses also may utilize premises configurations that are heterogeneous, such as where the business premises has both indoor and outdoor components or portions (e.g., a café or restaurant with both indoor seating and outdoor seating). The use cases and/or user density in each of these heterogeneous areas may vary significantly, as may one or more policies intended to be applied to such users relative to each area by the business owner. Moreover, users situated beyond the outdoor premises boundary (for instance across the street or a block away) who are presumably not customers of the small business may require provision of wireless service.

Hence, an omni-directional antenna solution will not provide sufficient differentiation between the heterogeneous areas, since its radiated power at any given frequency (i.e., for any given communication channel or technology) is delivered in all directions. Multi-sector antennas of the type previously described are an improvement over omni-directional solutions for such use cases; however, precise beam steering or forming and/or spatial diversity techniques are not necessarily useful in each of the heterogeneous premises portions or use cases, and in fact add unnecessary cost and complexity to many installations where such capability is not needed.

Moreover, in particular case of CBRS spectrum, extant antenna solutions and their supporting infrastructure such as base stations (e.g., CBSDs) are not configured or optimized for utilization of the available different types of CBRS spectrum, including in heterogeneous use cases such as those exemplary small businesses described above, and operation below the CBSD/CPE limit of 1 W.

Accordingly, there exists a need for a methodology to improve wireless service performance such as in heterogeneous use cases such as those described above, including ideally also providing an effective low-power CBRS cell deployment that leverages the specific attributes of the CBRS spectrum and underlying infrastructure.

SUMMARY

The present disclosure addresses the foregoing needs by providing, inter alia, apparatus and methods for providing heterogeneous (e.g., different types of spectrum, user, served areas, etc.) wireless services using quasi-licensed spectrum.

In one aspect, a method for providing wireless spectrum assignment is disclosed. In one embodiment, the wireless spectrum being allocated comprises CBRS-band spectrum within the GAA portion and the PAL portion, and the method includes communicating data between at least one CBSD/xNB and its controller (e.g., DP).

In another aspect, a wireless access point is disclosed. In one embodiment, the wireless access point includes: a processor apparatus; a first wireless modem chipset in data communication with the processor apparatus; a second wireless modem chipset in data communication with the processor apparatus; and a storage device in data communication with the processor apparatus. In one variant, the storage device includes at least one computer program which is configured to, when executed on the processor apparatus, cause a first RF carrier within a first type of wireless spectrum to be allocated to the first chipset, and a second RF carrier within a second type of wireless spectrum to be allocated to the second chipset, the first and second chipsets configured to operate contemporaneously to provide differentiated services to at least two different user classes. In one implementation, the first RF carrier is within a CBRS GAA band, and the second RF carrier is within a CBRS PAL band.

In a further implementation, the wireless access point includes a CBRS (Citizens Broadband Radio Service)-compliant CPE. In another implementation, the wireless access point includes a CBRS-compliant CBSD based on a 3GPP compliant eNB or gNB. In a further implementation, the wireless access point is a distributed unit (DU) of a 5G NR gNB.

In another aspect of the disclosure, a computerized wireless access apparatus configured for providing wireless access to a plurality of computerized wireless-enabled mobile devices via a quasi-licensed portion of a radio frequency (RF) spectrum is disclosed. In one embodiment, the computerized wireless access includes: a wireless interface configured to transmit and receive RF waveforms in two different bands (e.g., PAL and GAA) of the quasi-licensed portion; digital processor apparatus in data communication with the wireless interface; a multi-sector antenna apparatus; and a storage device in data communication with the digital processor apparatus and comprising at least one computer program.

In one variant, the node comprises a Category A device which operates at or below the 1 W FCC limit. In another variant, the node comprises a Category B CBSD that also includes a 3GPP 4G/4.5/5G protocol stack.

In another variant, the at least one computer program is configured to, when executed by the digital processor apparatus: receive a first protocol message from a computerized network node, the first protocol message including a first information element (IE) to the wireless access point specifying (i) a selected first RF carrier in a first RF band type, and (ii) a selected second RF carrier in a second RF band type, the message causing the wireless access apparatus to use the selected RF carriers for different sectors of the antenna apparatus.

In another aspect of the disclosure, network apparatus for use within a first network is disclosed. In one embodiment, the network apparatus is configured to generate messaging to one or more attached devices regarding RF carrier assignment plans, and includes: digital processor apparatus; network interface apparatus in data communication with the digital processor apparatus and configured to transact data with the one or more attached devices; and a storage apparatus in data communication with the digital processor apparatus and comprising at least one computer program. In one variant, the network apparatus comprises a CBRS DP (domain proxy). In another variant, the network apparatus comprises a managed network controller process (e.g., MSO-based controller owned and operated by the MSO and disposed within the MSO's network architecture.

In a further aspect of the disclosure, a fixed wireless access (FWA) apparatus for use within a wireless network is disclosed. In one embodiment, the FWA apparatus comprises a premises device operated by a network operator (e.g., MSO) that is configured to communicate wirelessly with one or more CBSD/xNB devices to obtain wireless backhaul from the premises. In one variant, the FWA apparatus is configured as a Category B CBSD CBRS device and is mounted on the user's premises so as to enable the aforementioned backhaul for WLAN or wireline interfaces within the premises, and further includes a Category A wireless access point with multi-sector antenna and at least two RF modem chipsets. In one variant, the FWA apparatus is integrated with the wireless access point such that at least one of the sectors is used for wireless backhaul to a local CBSD, while the remaining sectors are used for GAA/PAL coverage within a local area (i.e., proximate to the premises where installed).

In another aspect, an antenna apparatus is disclosed. In one embodiment, the antenna apparatus includes a plurality of sector antenna elements each configured to operate within a prescribed frequency band (e.g., 3.55-3.70 GHz). In one variant, the antenna apparatus includes three (3) antenna elements, with two allocated to one "licensed" quasi-licensed band (e.g., PAL), and one allocated to a non-licensed quasi-licensed band (e.g., GAA). In one implementation, the two PAL elements have a first prescribed azimuth coverage, while the GAA element has a different (larger) azimuth coverage. In another implementation, the central radiation axis of each element is adjustable so as to enable different patterns of coverage by the three elements in combination.

In a further aspect, a method of operating a wireless access point is disclosed. In one embodiment, the method includes: obtaining a first information element (IE) comprising data relating to a selected first RF (radio frequency) carrier within a first type of frequency band; obtaining a second information element (IE) comprising data relating to a selected second RF carrier within a second type of frequency band; causing a first modem of the wireless access point to use the first RF carrier based on the first IE, the use of the first RF carrier comprising use via a first antenna element of a plurality of antenna elements of the wireless access point; and causing a second modem of the wireless access point to use the second RF carrier based on the first IE, the use of the second RF carrier comprising use via at least one second antenna element of the plurality of antenna elements of the wireless access point.

In one variant, the first IE is generated based at least in part on data received from one of a SAS (Spectrum Access System) or a Domain Proxy (DP) indicating the availability of the first RF carrier within a GAA (General Authorized Access) quasi-licensed band; and the second IE is generated based at least in part on data received from one of a SAS (Spectrum Access System) or a Domain Proxy (DP) indicating the availability of the second RF carrier within a PAL (Priority Access License) quasi-licensed band.

In one implementation, both the first and second RF carriers comprise a frequency between 3.550 and 3.700 GHz.

In another variant, the first modem comprises a non-spatial diversity capable modem chipset, and the second modem comprises a spatial diversity capable chipset.

In a further variant, the first antenna element is configured to radiate within a first azimuth value; the at least one second antenna element comprises two antenna elements each configured to radiate within a second azimuth value smaller than the first azimuth value; the causing the first modem of the wireless access point to use the first RF carrier via the first antenna element comprises causing radiation from the first antenna element via the first RF carrier within the first azimuth value; and the causing the second modem of the wireless access point to use the second RF carrier via the at least one second antenna element comprises causing radiation from the two antenna elements via the second RF carrier within the second azimuth value, the radiation from the first antenna element and two antenna elements being simultaneous and substantially non-overlapping in at least azimuth.

In a further aspect, a network architecture is disclosed. In one embodiment, the architecture includes: (i) a domain proxy (DP) or controller entity; and (ii) a plurality of Category A wireless access point devices disposed at respective user or subscriber premises. In one variant, the DP/controller negotiates with a SAS to obtain both GAA spectrum allocation(s) and PAL spectrum allocation(s), generates a frequency use plan, and transmits data relating to the allocations relative to the use plan to the various wireless access points so as to implement the frequency use plan using both PAL and GAA spectrum. In one implementation, only the PAL spectrum is considered in the use plan; GAA is freely assigned for e.g., indoor uses.

In yet another aspect, a computerized wireless-enabled user device configured for quasi-licensed band operation is disclosed. In one embodiment, the computerized wireless-enabled user device includes: a first wireless data interface configured to utilize at least first and second quasi-licensed radio frequency (RF) spectrum; digital processor apparatus in data communication with the first wireless data interface; and a storage device in data communication with the digital processor apparatus and comprising at least one computer program.

In one variant, the at least one computer program includes a plurality of instructions which are configured to, when executed by the digital processor apparatus, cause the computerized wireless-enabled user device to: establish a communications session via the first RF spectrum; determine that a transition to the second RF spectrum is required; maintain the communication session while transition to the second RF spectrum is established; and continue In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device, such as an MSO controller, DP, or SAS entity. In another embodiment, the apparatus includes a program memory, HDD or SSD on a computerized access node (e.g., CBSD/xNB or CPE).

In a further aspect, a method of reducing interference is disclosed. In one embodiment, the method comprises utilizing a first RF spectrum type within a first region of coverage of a multi-sector antenna, and using a second RF spectrum type in a second region of coverage. For instance, the first RF spectrum type may be CBRS GAA spectrum which is expected to be comparatively "polluted" with multiple unlicensed users, and the first region may be an indoor region of a building, the indoor region have a limited number of other possible users and being at least partly shielded from external/exterior unlicensed users. The second RF spectrum (e.g., PAL) is ostensibly more sparsely used, and hence better suited to a higher (prospective) interference environment.

These and other aspects shall become apparent when considered in light of the disclosure provided herein.

Figure 1:
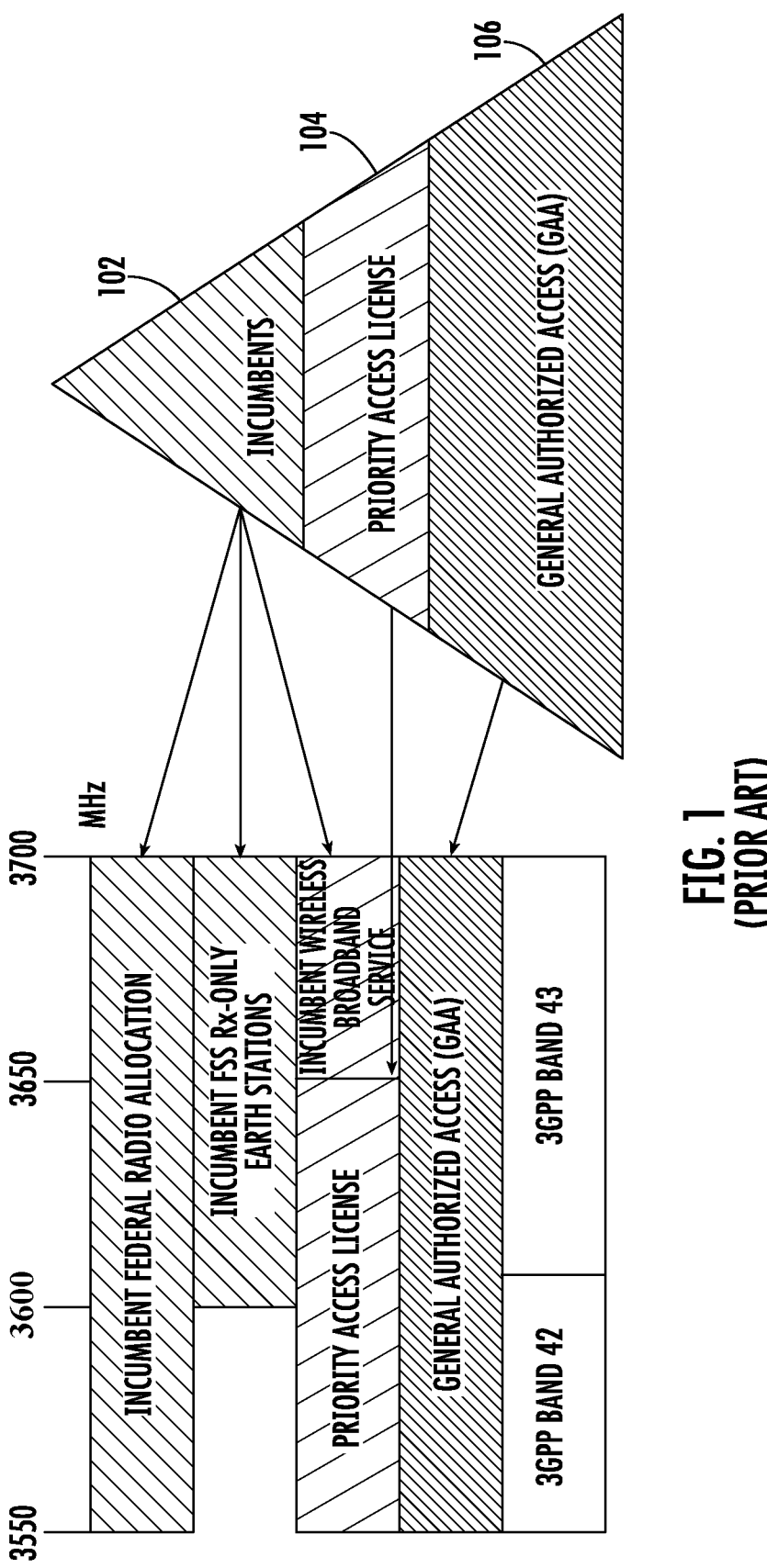
FIG. 1 is a graphical illustration of prior art CBRS (Citizens Broadband Radio Service) users and their relationship to allocated frequency spectrum in the 3.550 to 3.700 GHz band.
Figure 2:
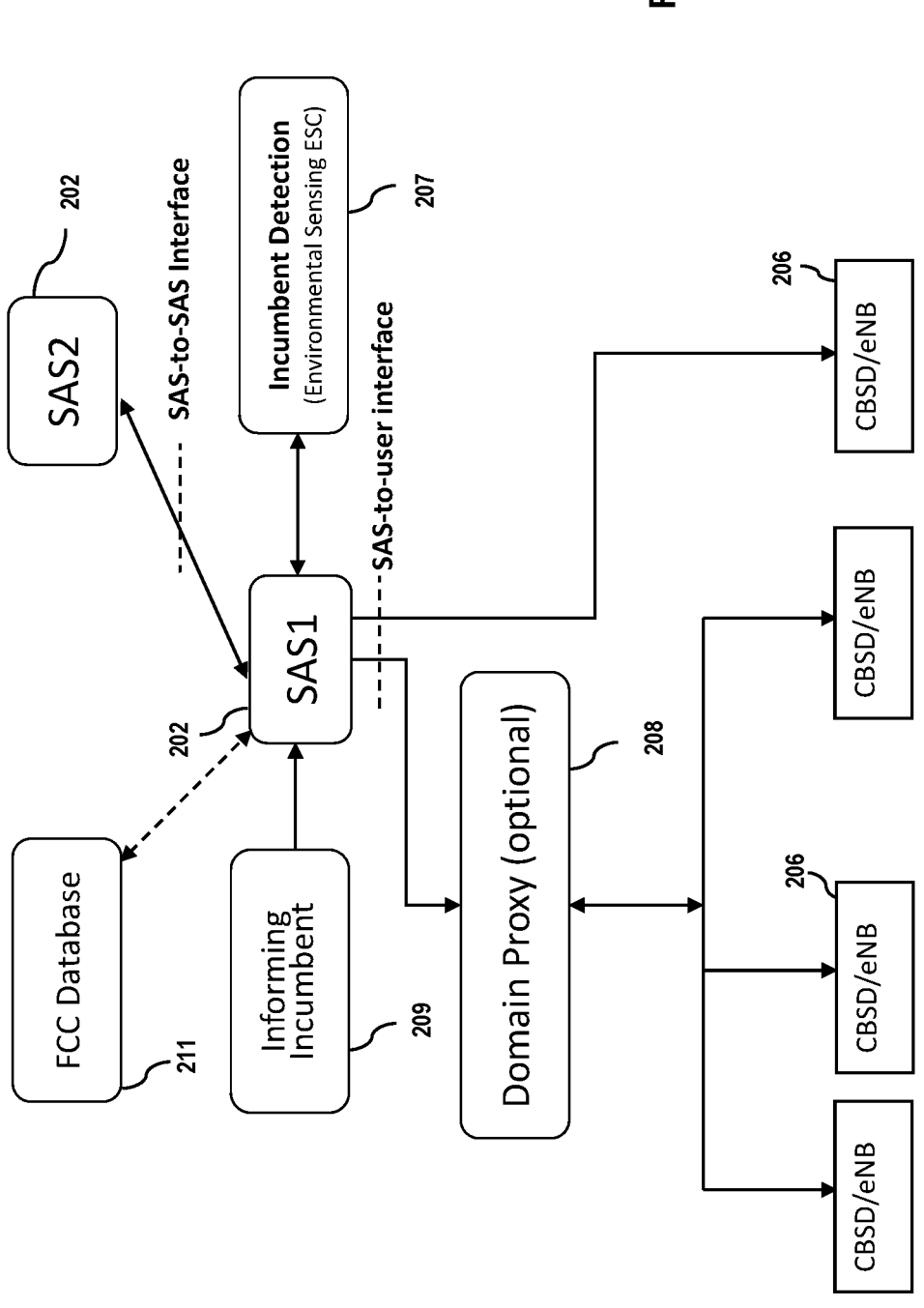
FIG. 2 is a block diagram illustrating a general architecture for the CBRS system of the prior art.
Figure 2A:
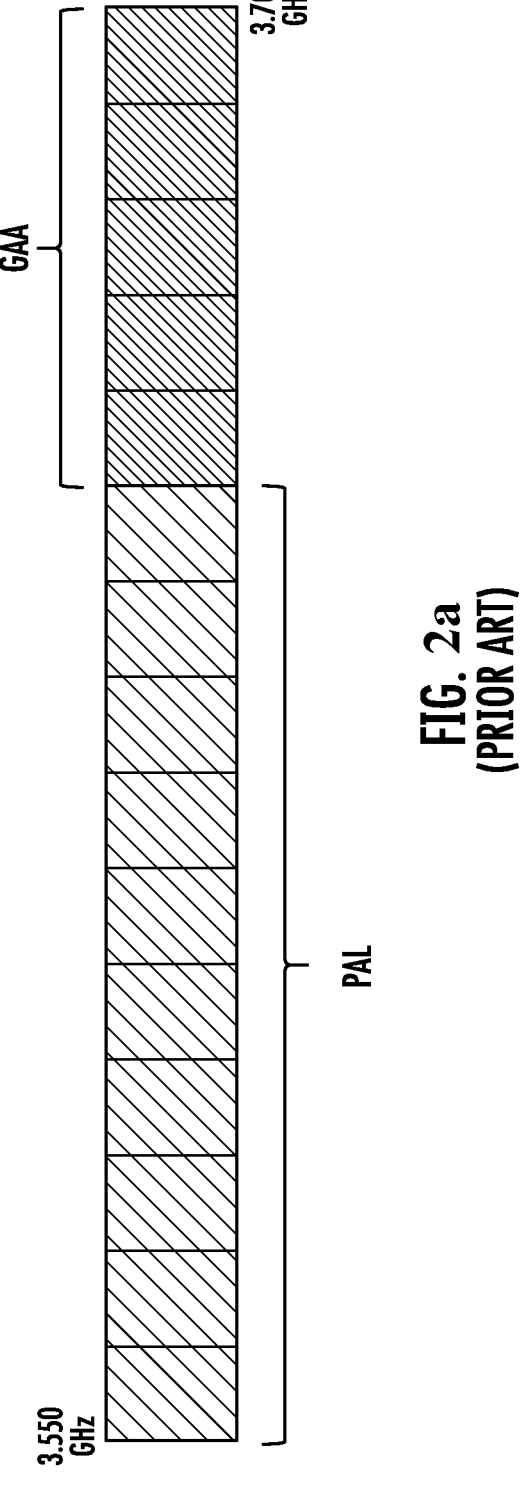
FIG. 2a is a graphical representation of allocations for PAL versus GAA users within the frequency band of FIG. 2.

All figures © Copyright 2018-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, FWA, or Wi-Fi AP.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for heterogeneous coverage via one or more base stations, such as those using "quasi-licensed" spectrum such as that provided by the recent CBRS technology initiatives.

In an exemplary embodiment, a tri-point "star" configurable indoor base-station for indoor and outdoor coverage is provided. A first antenna lobe covers the indoor portion of a venue or premises, while two other lobes provide outdoor (e.g., on-street) coverage. In one variant, the two latter lobes are configured at 65-degree nominal azimuth coverage each, and the first lobe is configured for 90-degree coverage. The base station is placed in one variant next to a window or other portal of the premises such that the aforementioned geometry maximizes wireless coverage both inside and outside the premises; i.e., the 90-degree sector covers a significant fraction of the indoor premises space, while the other sectors cover a significant fraction of the outdoor premises space (and beyond). In one implementation, CBRS GAA spectrum is allocated to the "indoor" sector of the antenna, while PAL spectrum is allocated to the "outdoor" sectors. The use of a single antenna element for the indoor sector enables use of a lower-cost commodity RF modem chipset within the access point for provision of the GAA-based service, while a higher-cost MIMO-enabled chipset is used in the access point for the PAL/outdoor sectors.

The exemplary configuration described above provides, inter alia, better outdoor coverage due to higher gain and directionality in a given a direction as compared to an omni-directional antenna. It further allows for better interference control compared with omni-directional antennas that can receive interfering signal equally in all directions.

In addition, better signal quality is afforded by keeping GAA confined within the user premises (e.g., building). Specifically, GAA spectrum is expected to become highly "polluted" due to unlicensed operation, in contrast to PAL which is licensed (and available for general use only when otherwise unoccupied); by confining GAA use to indoors, the GAA antenna sector and modem is less prone to interference).

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed small business, or other type of premises), the present disclosure may be readily adapted to other types of environments including, e.g., enterprise domain (e.g., corporate buildings or campuses), or even governmental uses, such as those outside the proscribed "incumbent" users such as U.S. DoD and the like. Yet other applications are possible.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while described primarily in terms of GAA 106 spectrum and PAL 104 allocation (see FIG. 1), the methods and apparatus described herein may also be adapted for allocation of other "tiers" or sub-tiers of CBRS or other unlicensed spectrum (whether in relation to GAA/PAL spectrum, or independently).

Moreover, while described in the context of quasi-licensed or unlicensed spectrum, it will be appreciated by those of ordinary skill given the present disclosure that various of the methods and apparatus described herein may be applied to delivery of heterogeneous services (including also allocation/assignment of spectrum or bandwidth to those services) within a licensed spectrum context; e.g., for cellular voice or data bandwidth/spectrum allocation, such as in cases where a given service provider must provide differentiated or heterogeneous service to users.

Moreover, while various aspects of the present disclosure are described in detail with respect to so-called "4G/4.5G" 3GPP Standards (aka LTE/LTE-A), such aspects—including allocation/use/withdrawal of CBRS spectrum—are generally access technology "agnostic" and hence may be used across different access technologies, including so-called 5G "New Radio" (3GPP Release 15 and TS 38.XXX Series Standards and beyond).

Other features and advantages of the present disclosure will immediately be recognized by persons of ordinary skill in the art with reference to the attached drawings and detailed description of exemplary embodiments as given below.

Configurable Multi-Sector Antenna Apparatus—

Figure 3:
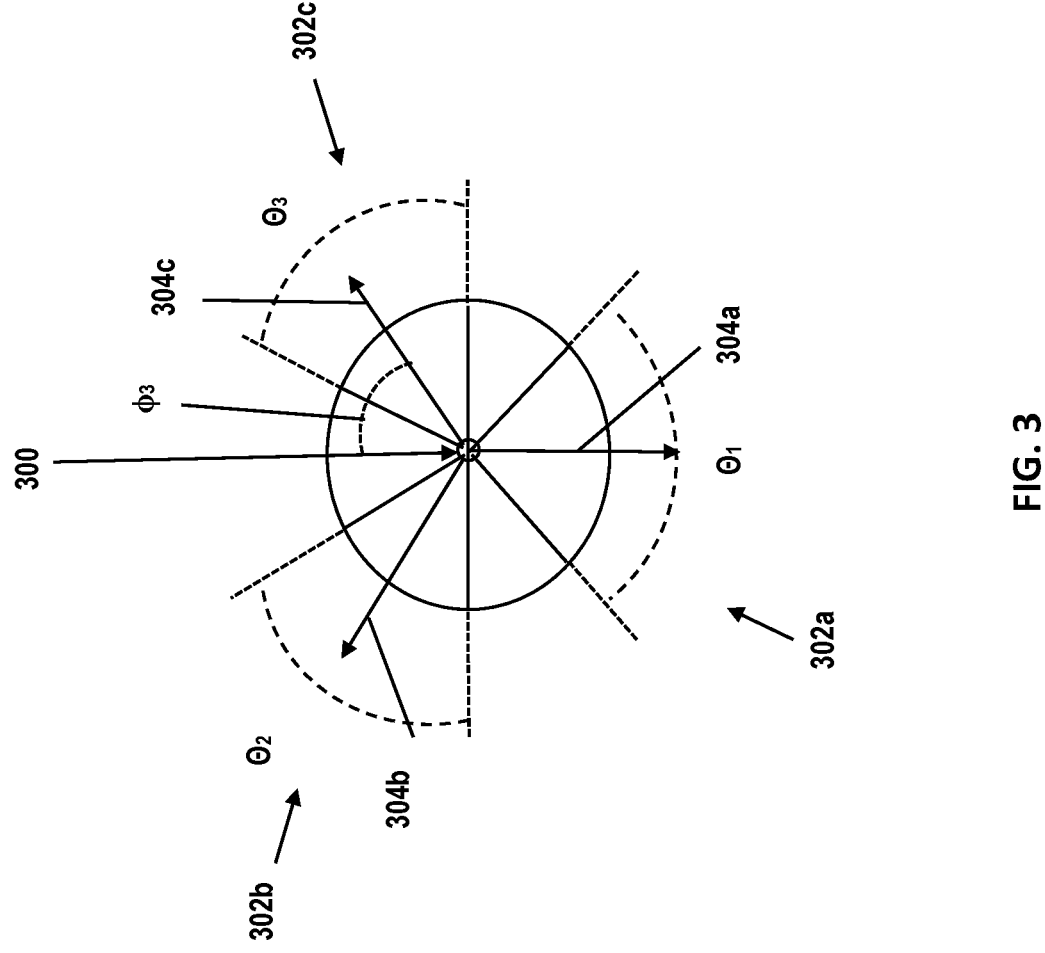
FIG. 3 is a plan view of one exemplary embodiment of a sectorized antenna apparatus according to the present disclosure.

FIG. 3 is a plan view of one exemplary embodiment of a sectorized antenna apparatus according to the present disclosure. As shown, the apparatus 300 includes a plurality of sectors 302a-c each with a corresponding radiator element with azimuth angle of coverage (Θn), with a central axis or lobe vector 304a-c associated therewith, each lobe axis 304a-c disposed at a polar angle of $\phi_n$. It will be appreciated that, as exemplified by the various examples described below with respect to FIGS. 3a-3f: (i) the number of sectors can be varied; (ii) the azimuth coverage of each sector may be varied and/or non-uniform across the sectors; (iii) the polar angle of each center axis may be varied and/or non-uniform across the sectors; (iv) The EIRP or radiated power of each sector may be varied and/or non-uniform across the sectors; (v) the shape of the lobe for each sector may be varied and/or non-uniform across the sectors; (vi) the frequency/carrier assignments of each lobe may be varied and/or non-uniform across the sectors; (vii) intra-sector (lobe) spatial diversity may be used (e.g., a given sector can utilize two sub-elements for spatial diversity purposes) and/or non-uniform across the sectors; and (viii) inter-sector (lobe) spatial diversity may be used; e.g., two or more sectors can be utilized for spatial diversity purposes.

Figure 3A:
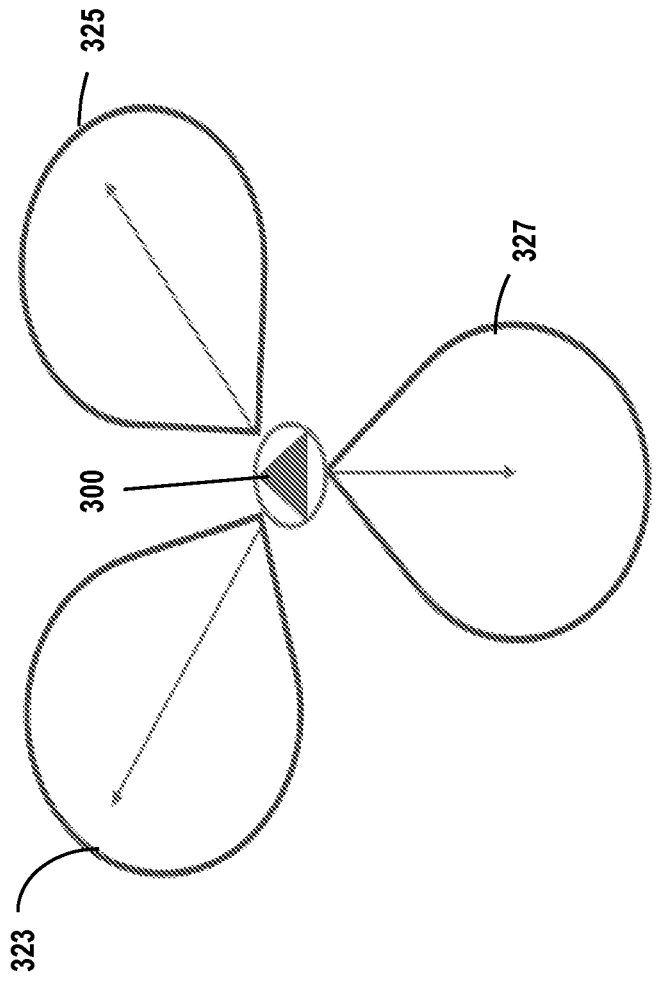
FIG. 3a is a graphical illustration of a first exemplary implementation of the sectorized antenna apparatus of FIG. 3, showing the radiation lobes thereof.

FIG. 3a is a graphical illustration of a first exemplary implementation of the sectorized antenna apparatus of FIG. 3, showing the radiation lobes thereof. In this embodiment, a tri-point star configuration using a 3 sector antenna with 3 lobes in a CBRS-based wireless system is shown. In one scenario, the (diagrammatically) lower antenna lobe 327 would cover the inside of a building such as within a store in a dense urban area. The two other lobes 323, 325 would provide coverage outside the building. In one such configuration, antenna apparatus 300 can be mounted by a window or door (or some other at least partly transmissive medium) at an optimal height. One configuration utilizes 65 degree horizontal beam-width for the upper two lobes 323. 325 and 90 degree beam-width for the lower lobe 327. This configuration provides better outdoor area coverage due to higher gain and directionality. It also ostensibly allows for better interference profile compared with omni-directional antennas that radiate power equally in all directions, since off-axis interference sources would contribute less to the total interference experienced by each lobe. Stated differently, transmitting only in directions needed with multiple sectors would reduce interference with other CBSDs. In addition, use of more frequency channels reduces interference (inside as well as outside of the premises) because the various sectors/chains are transmitting on different RF channels.

In one exemplary embodiment, the apparatus 300 uses reconfigurable antenna elements would allow for inter alia, individual change of azimuth, polar angle, and element tilt. For instance, in one variant, each element is mounted on a two-axis (degree of freedom) mount such that it can be rotated in the azimuth plane (φ) as well as in a vertical dimension. Change in azimuth coverage (θ) can be provided using any number of means, such as e.g., use of different size/shape antenna elements or waveguides.

Furthermore, the unit may be adjusted vertically (height) via e.g., an attached extensible stand, or placement on a wall-mounted bracket or tray, or even suspended from or mounted to an overhead such as a ceiling.

In one implementation, and as discussed in greater below, the lower lobe uses CBRS GAA spectrum, while outdoor lobes/elements 323, 325 use PAL licensed CBRS spectrum. As discussed in greater detail below with respect to FIGS. 4a-4c, exemplary embodiments of the antenna apparatus 300 make use of software-defined radio transceivers that allow, among other things, configurable bands and channels on all sectors.

Figure 3B:
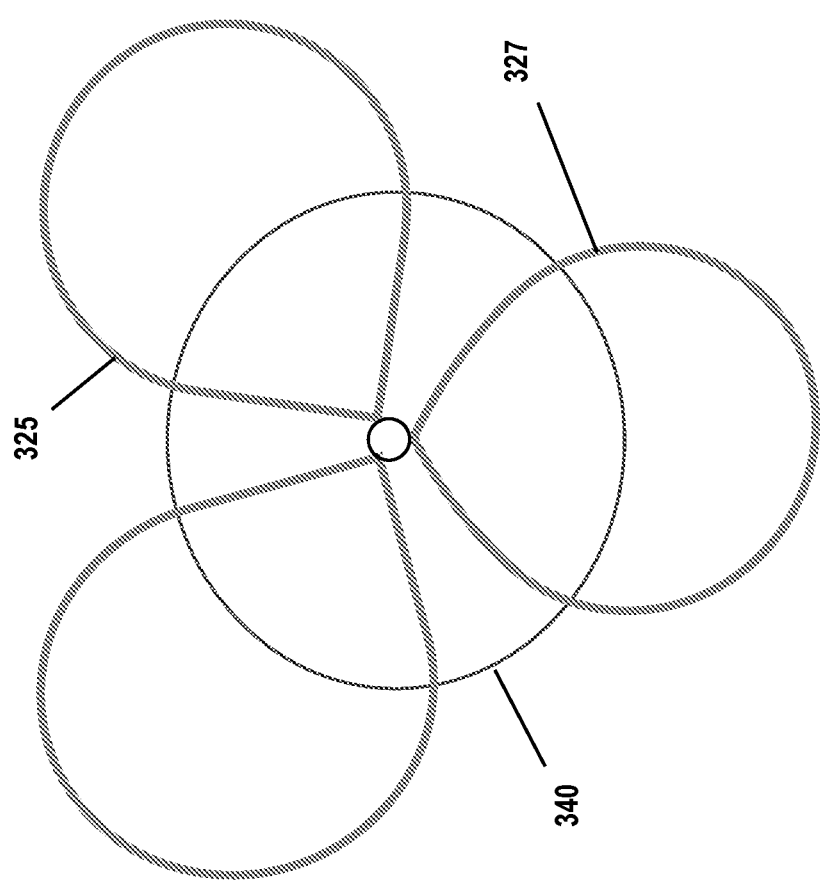
FIG. 3b is a graphical illustration of the sectorized antenna apparatus of FIG. 3a, showing the radiation lobes thereof relative to a comparable omni-directional antenna of the same aggregate EIRP value.

FIG. 3b is a graphical illustration of the sectorized antenna apparatus of FIG. 3a, showing the radiation lobes thereof relative to a comparable omni-directional antenna profile 340 of the same aggregate EIRP value. As shown, since power is radiated only (primarily) within the three lobes shown, greater lobe coverage (radius) is achieved for the same total EIRP for the apparatus 300. Moreover, in one embodiment, each of the RF front end(s) associated with each of the lobes is tuned such that the EIRP of each sector (lobes) does not exceed the mandated 1 W for Category A devices, thereby avoiding professional installation and other associated restrictions (i.e., a user or customer can feasibly install in their premises).

Figure 3C:
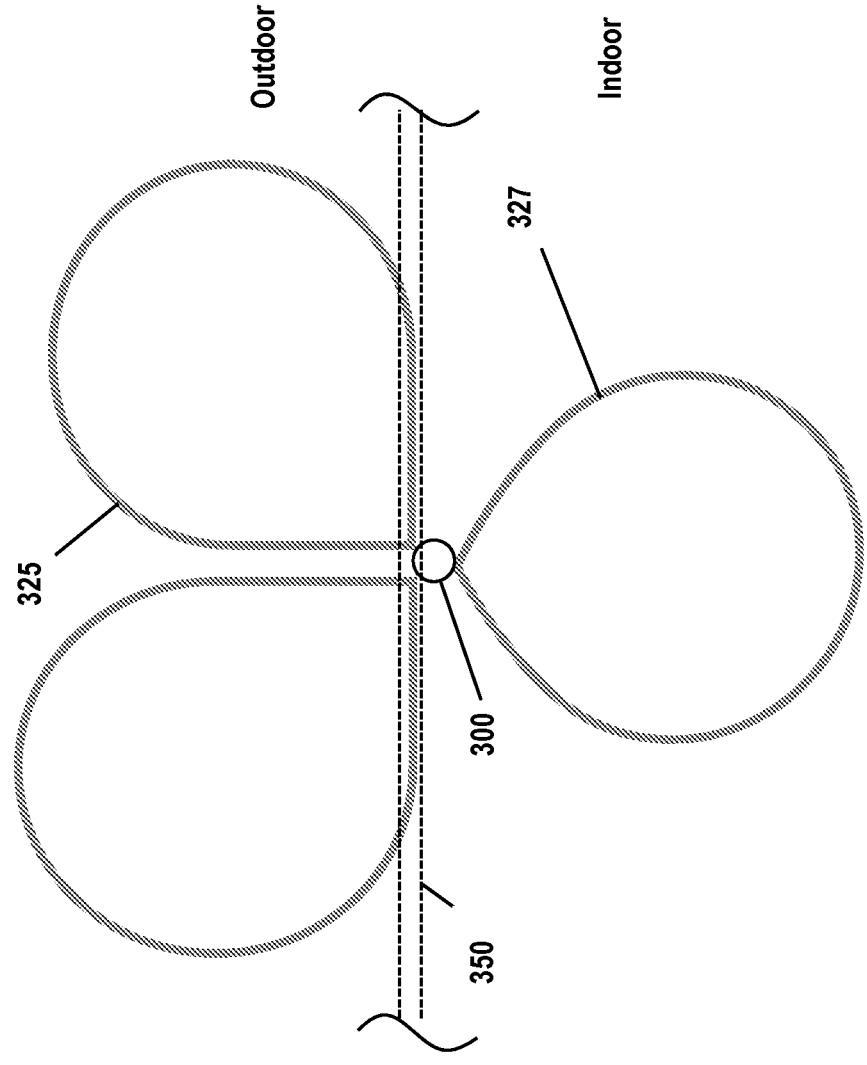
FIG. 3c is a graphical illustration of a second exemplary implementation of the sectorized antenna apparatus of FIG. 3, showing the radiation lobes thereof relative to an extant structure (e.g., wall).

FIG. 3c is a graphical illustration of a second exemplary implementation of the sectorized antenna apparatus of FIG. 3, showing the radiation lobes thereof relative to an extant structure (e.g., wall) 350 punctuating indoor and outdoor areas of the premises. In this implementation, the two "outdoor" sectors 323, 325 are adjusted in polar angle (φ) so as to provide maximal outdoor coverage without interference relative to the wall 350.

Figure 3D:
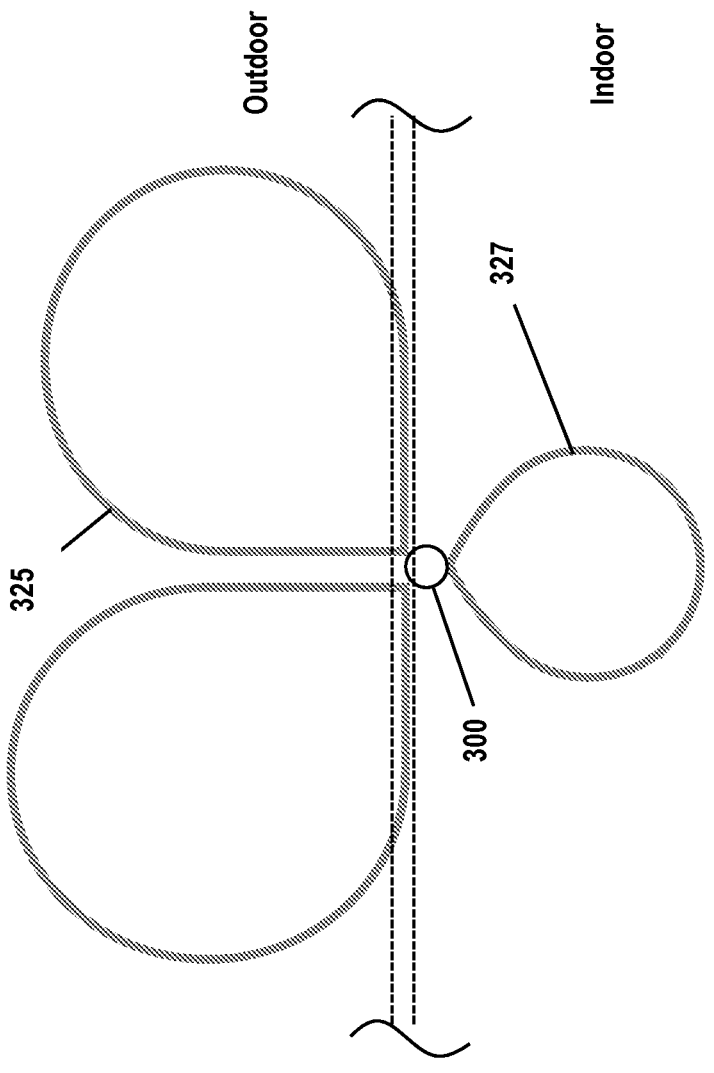
FIG. 3d is a graphical illustration of a third exemplary implementation of the sectorized antenna apparatus of FIG. 3, showing radiation lobes with asymmetric power relative to an extant structure (e.g., wall).

FIG. 3d is a graphical illustration of a third exemplary implementation of the sectorized antenna apparatus of FIG. 3, showing radiation lobes with asymmetric power relative to an extant structure (e.g., wall). As shown, the "indoor" lobe 327 is reduced in EIRP relative to the outdoor lobes 323, 325 since the indoor area has (i) reduced attenuation and (ii) enhanced signal reflection, relative to the outdoor space. Stated simply, users may get "three bars" of signal strength even at EIRP values below the maximum 1 W of Category A in this example.

Figure 3E:
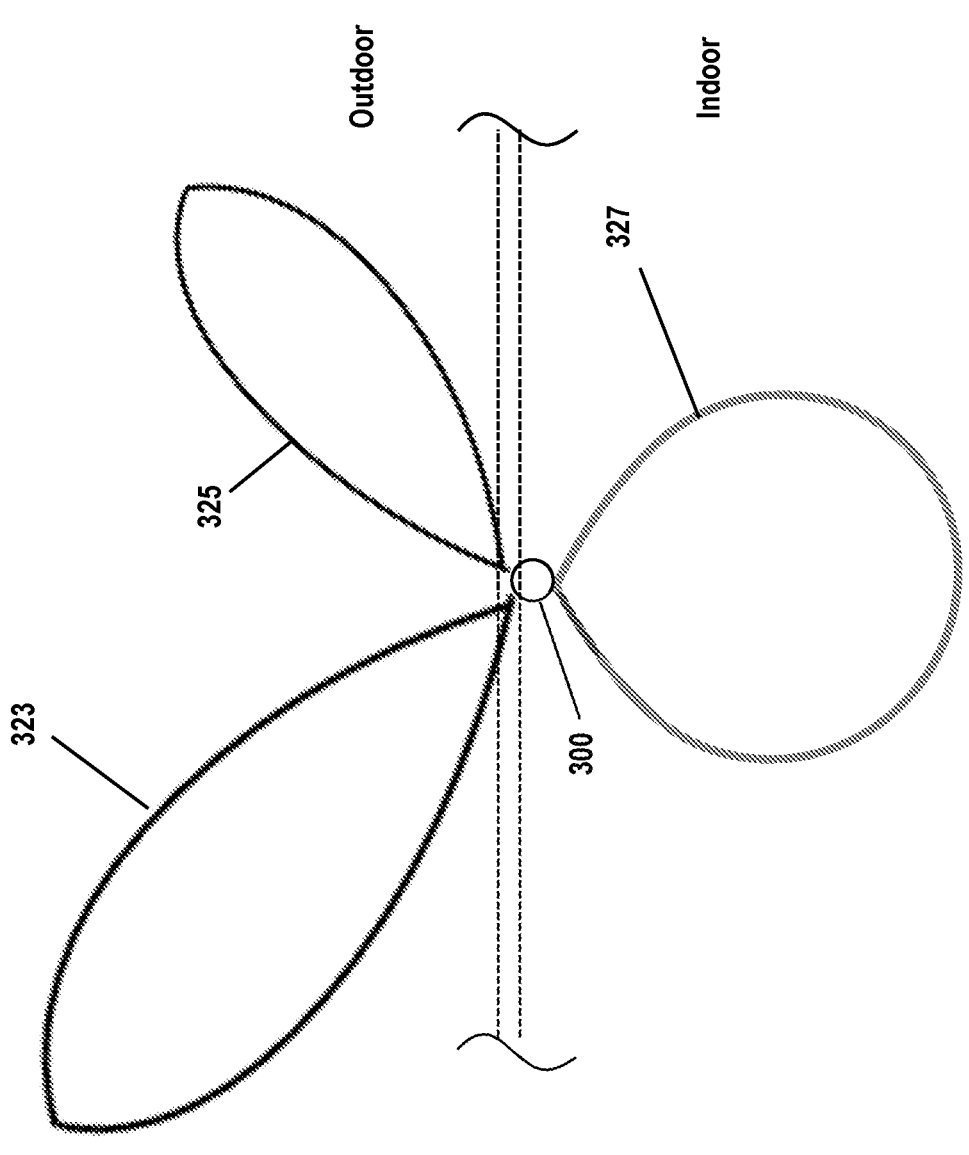
FIG. 3e is a graphical illustration of a fourth exemplary implementation of the sectorized antenna apparatus of FIG. 3, showing radiation lobes with asymmetric power and shape relative to an extant structure (e.g., wall).

FIG. 3e is a graphical illustration of a fourth exemplary implementation of the sectorized antenna apparatus of FIG. 3, showing radiation lobes with asymmetric power and shape relative to an extant structure (e.g., wall). As shown, the outdoor lobes 323, 325 may be both (i) asymmetric in EIRP relative to one another (and the indoor lobe 327), and (ii) asymmetric in lobe shape relative to one another (and the indoor lobe). For instance, the larger EIRP lobe 323 may be used where there is an unobstructed pathway in that direction (so as to provide enhanced range of coverage,), or where interference in that direction is greater, whereas the lesser EIRP lobe 325 is sufficient for coverage/interference in in its selected polar direction.

Figure 3F:
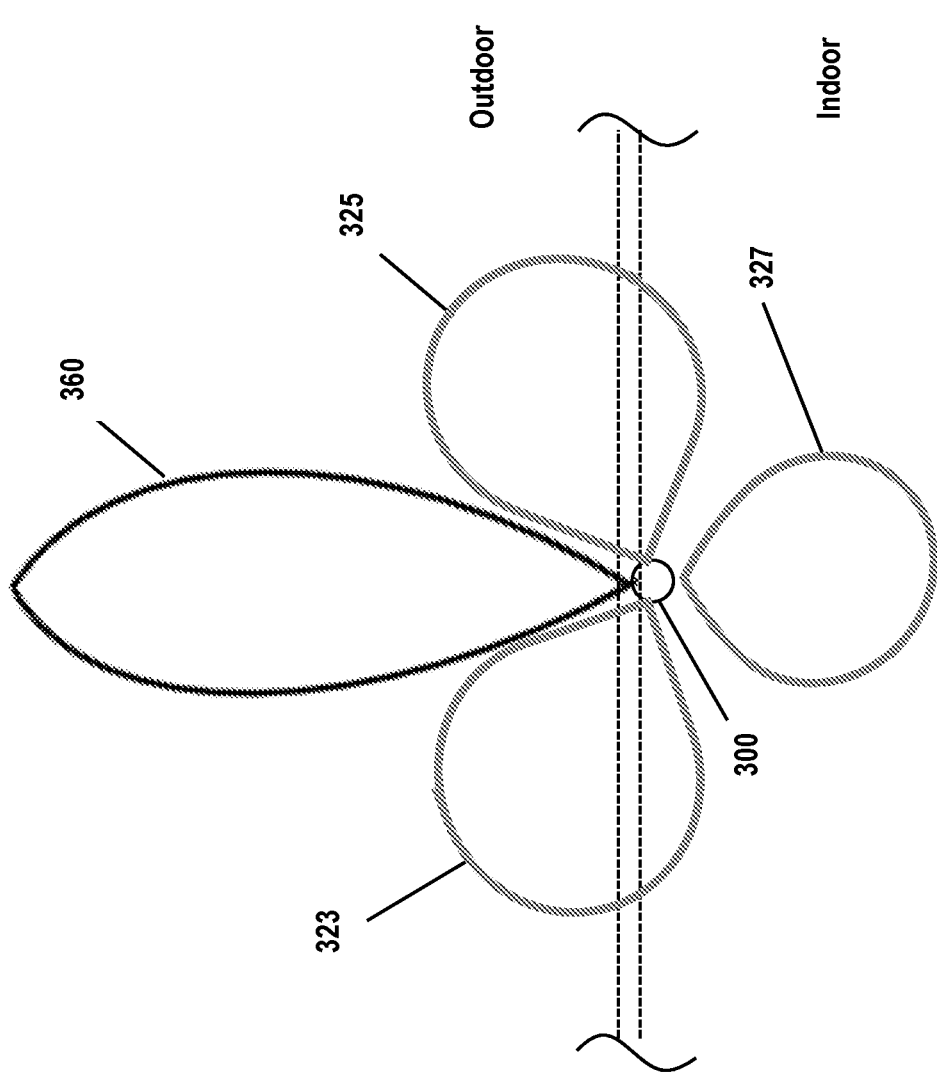
FIG. 3f is a graphical illustration of a fifth exemplary implementation of the sectorized antenna apparatus of FIG. 3, showing radiation lobes including a wireless backhaul lobe (sector) relative to an extant structure (e.g., wall).

FIG. 3f is a graphical illustration of a fifth exemplary implementation of the sectorized antenna apparatus of FIG. 3, showing radiation lobes including a wireless backhaul lobe (sector) 360 relative to an extant structure (e.g., wall). While some embodiments of the exemplary wireless access point described herein are backhauled by DOCSIS cable modem or other type of wireline backhaul (see discussion of FIGS. 5a and 5b herein), the embodiment of FIG. 3f contemplates use of a wireless backhaul (e.g., WMAN such as to a CBRS Category B CBSD, or IEEE Std. 802.16 base station, or 3GPP 5G NR gNB operating within licensed or quasi-licensed spectrum). As such, the backhaul sector/lobe 360 has its comparatively narrow lobe axis "pointed" at the corresponding backhaul device in one scenario, thereby minimizing possible interference between the backhaul and the PAL/GAA elements 323, 325 and 327, respectively. In one such variant, so-called "massive MIMO" associated with a 5G NR gNB is used in the DL direction to enable the backhaul node to substantially "point" its spatial diversity array beams at the backhaul sector lobe 360 of the apparatus 300.

Likewise, it will be appreciated that the access point with antenna apparats 300 can be wirelessly backhauled by a separate apparatus (e.g., CBRS FWA located outdoors or on the roof of the business), thereby alleviating the antenna apparatus 300 from having to utilize the backhaul sector/lobe 360.

Wireless Access Point (e.g., CBSD/xNB) Apparatus—

Figure 4A:
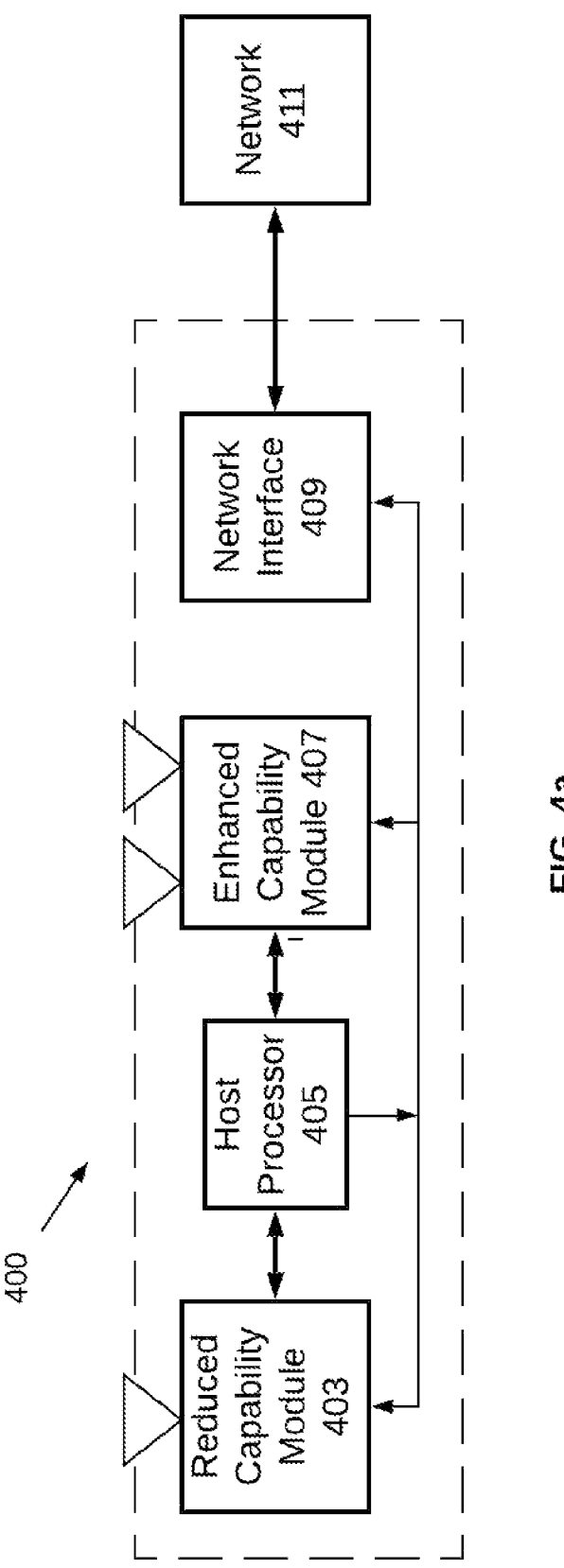
FIG. 4a is a block diagram illustrating an exemplary generalized embodiment of a Citizens Broadband radio Service Device (CBSD) and eNodeB (eNB) or CBSD/xNB apparatus according to the present disclosure.

Referring to FIG. 4a, a generalized representation of one embodiment of a device 400 for use in CBRS quasi-unlicensed CBRS wireless communication systems is illustrated. In one variant, the device 400 includes a reduced capability module 403, a processor module 405, an enhanced capability module 407, and a network interface 409.

The components of device 400 may be individually or partially implemented in software, firmware or hardware. The reduced capability module 403 is configured to process e.g., General Authorized Access (GAA) spectrum waveforms, whereas the enhanced capability module 407 is configured to process e.g., Priority Access License (PAL) waveforms. As described in greater detail below, the reduced capability module 403 may include a radio frequency (RF) chipset, antenna and an A/D-D/A module to operate in the quasi-unlicensed band Indoor environment. The enhanced capability module 407 may likewise include an RF chipset (here, more capable "high end" device with MIMO and other functionality), antennas, and an A/D-D/A module to operate within the outdoor environment. For instance, an exemplary Qualcomm Snapdragon X24 device may be used within the enhanced capability module 407, while a Snapdragon X12 could be used in the reduced capability module 403.

The device 400 also includes a processor module 405 which processes the digitally received/transmitted signal (baseband) from the RF modules 403 and/or 407. The processor module 405 may also include or be integrated with a modem for processing indoor signals (e.g., GAA), and another modem for processing outdoor signals (e.g., PAL). The device 400 includes a network interface 409 to logically connect to various entities or processes of the CBRS network 411 (see FIGS. 6-6b discussed below).

Figure 4B:
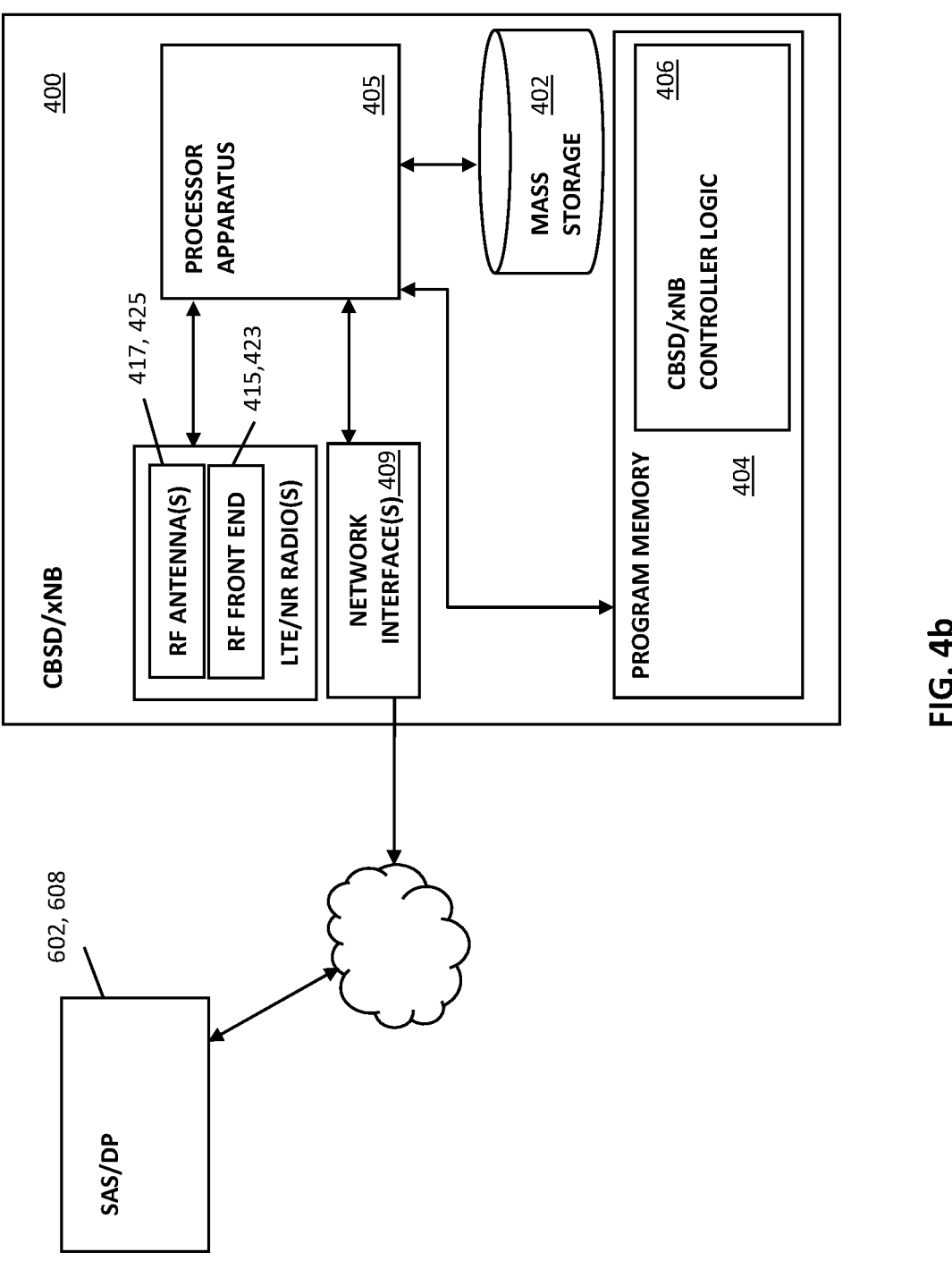
FIG. 4b is a functional block diagram illustrating an exemplary variant of the device of FIG. 4a for use in an MSO network.

FIG. 4b illustrates an exemplary CBSD/xNB access node 400 based on the generalized architecture of FIG. 4a. As shown, the CBSD/xNB 400 includes, inter alia, a processor apparatus or subsystem 405, a program memory module 404, mass storage 402, a CBRS/xNB controller logic module 406, one or more network (e.g., SAS/DP, controller 510 and LAN) interfaces 409, as well as one or more radio frequency (RF) devices having, inter alia, antenna(e) 417, 425 and one or more RF front ends 415, 423.

At a high level, the exemplary CBSD/xNB 400 of FIG. 4b maintains in effect two "stacks"; (i) a CBRS-compliant stack for communication of the CBSD/xNB (acting as a CBRS-compliant entity) with other CBRS entities such as SAS/DP, according to e.g., the Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety; and (ii) a 3GPP-compliant LTE/LTE-A/5G NR "stack" for CBSD/xNB (acting as a EUTRAN eNB or NR gNB) communications with 3GPP-compliant UEs (mobile devices 606), and/or with one or more CPE 624 such as described above with respect to FIGS. 6-6b herein. These two stacks are implemented and controlled via the controller process (logic) 406 of the CBSD/xNB such that CBSD/xNB-to-SAS communication protocols and CBSD/xNB-to-CPE protocols are used in a coordinated fashion to enhance session continuity and perform the enhanced frequency reassignment functionality previously described.

In the exemplary embodiment, the processor 405 may include one or more of a digital signal processor, microprocessor, field-programmable gate array, or plurality of processing components mounted on one or more substrates. The processor may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 405.

The RF antenna(s) 417, 425 are configured to detect and transceive signals from radio access technologies (RATs) in the service area or premises with which the CBSD/xNB is associated. For example, LTE (including, e.g., LTE, LTE-A, LTE-U, LTE-LAA) signals may be used as the basis of communication between the CBSD/xNB 400 and the various mobile devices (e.g., UEs) and/or CPE 624 being served. The antenna(s) 425 associated with the enhanced capability chipset 407 (FIG. 4c) may include multiple spatially diverse individual elements in e.g., a MIMO- or MISO-type configuration, such that spatial diversity of the transceived signals can be utilized. In contrast, a single antenna is used in one embodiment to service the reduced-capability chipset 403, since no spatial diversity processing need be performed.

In the exemplary embodiment, the radio interface(s) comprise one or more LTE-based radios compliant with 3GPP. Additional unlicensed, licensed, or quasi-licensed air interfaces may also be used within the CBSD/xNB, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN provides very high-bandwidth, very low-latency (e.g., on the order of 1 ms or less "round trip") wireless communication and efficiently utilizes, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN also integrates with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 16 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As such, the various aspects of the present disclosure can be readily adapted for use within the 5G NR context, including use of a CBSD/gNB, and associated CU/DU functionality and "splits" to implement the functions described herein.

The front end 415, 423 in one embodiment comprises a digitally controlled RF tuner capable of reception of signals via the RF front end (receive chain) of the LTE radio in the aforementioned bands, including in one variant simultaneous reception (e.g., both 2.300 to 2.500 and 3.550 to 3.700 GHz bands at the same time). It will be appreciated, however, that such simultaneous LTE/NR capability is purely optional; the present disclosure contemplates that the wireless access point 400 may simply operate only in designated quasi-licensed GAA and PAL bands.

Figure 7:
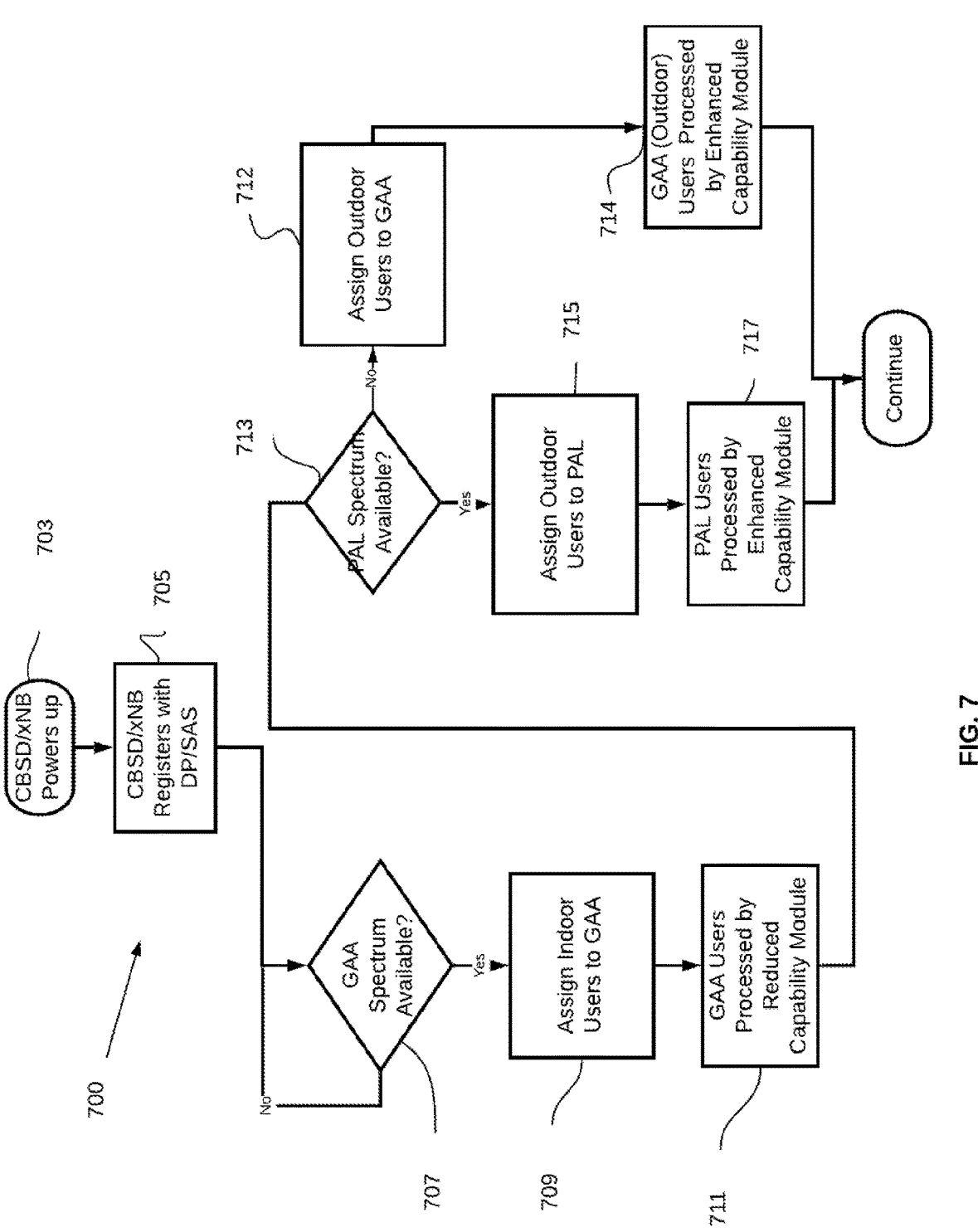
FIG. 7 is logical flow diagram of an exemplary method for providing quasi-licensed band spectrum (e.g., CBRS GAA and PAL) assignments according to the present disclosure.

The processing apparatus 405 is configured to execute at least one computer program stored in memory 404 (e.g., a non-transitory computer readable storage medium); in the illustrated embodiment, such programs include logic to implement the frequency assignment logic described herein (see e.g., FIG. 7). Other embodiments may implement such functionality within dedicated hardware, logic, and/or specialized co-processors (not shown).

Figure 6:
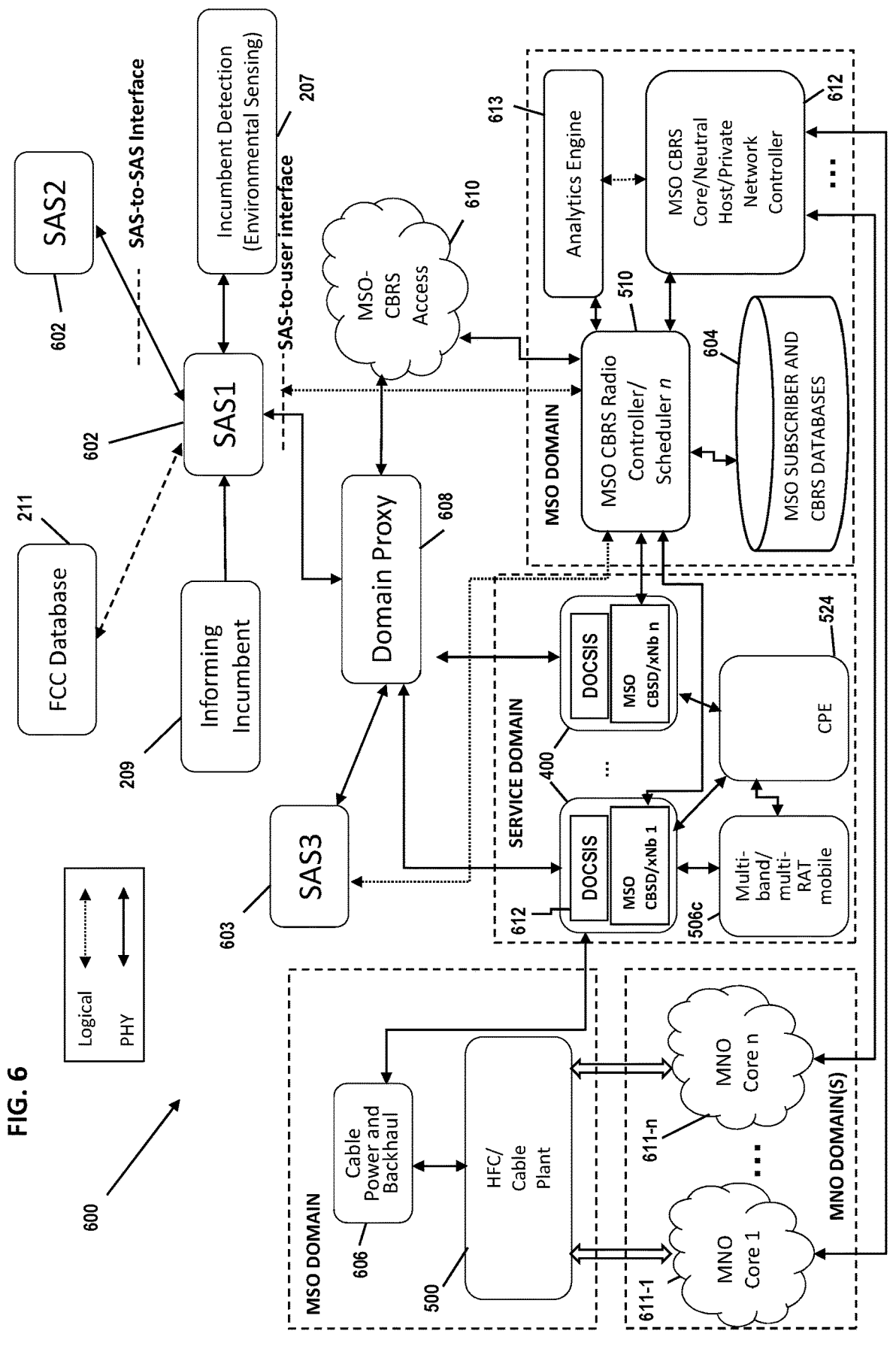
FIG. 6 is a functional block diagram of a first exemplary embodiment of a quasi-licensed wireless network infrastructure useful with various aspects of the present disclosure.

In some embodiments, the controller logic program 406 utilizes memory 404 or other storage 402 configured to temporarily hold a number of data reports or files before transmission via the backend interface(s) to the SAS 202, 203, DP 608, and/or CC 510 (if present; see discussion of FIG. 6). In other embodiments, application program interfaces (APIs) such as those included in an MSO-provided application or those natively available on the CBSD/xNB (e.g., as part of the computer program or associated with the controller logic 406) may also reside in the internal cache or other memory 404. Such APIs may include common network protocols or programming languages configured to enable communication between the CBSD/xNB 400 and SAS/DP, and/or CC 510 and other network entities as well as use procedures for collecting, compressing and/or parsing information obtained via the antenna(s) and radio. Data stored may relate for example to prescribed 3GPP or CBRS reporting from the UEs (e.g., measurement report data, RSSI, active applications operative on a given UE for purposes of evaluating session activity/currency, etc.) such that a receiving device (e.g., SAS/DP, controller 510, or other EUTRAN or 5GC entity) may interpret the reports in order to extract and analyze the relevant information.

Figure 4C:
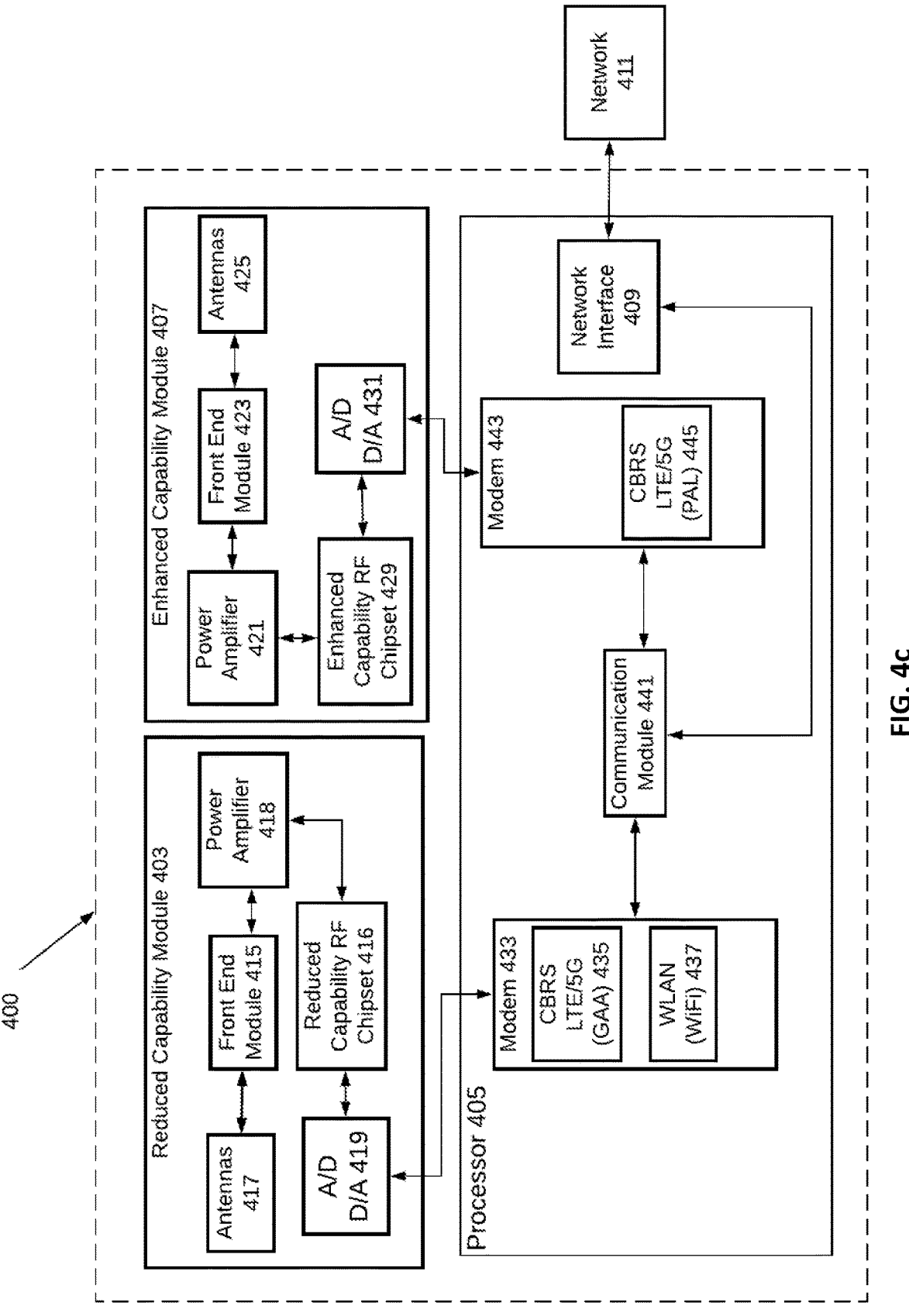
FIG. 4c is a functional block diagram illustrating an exemplary implementation of a component architecture of the device of FIG. 4b.

FIG. 4c illustrates one particular implementation of the device 400 of FIG. 4b for use in quasi-licensed CBRS wireless communication systems. The device 400 includes a reduced capability module 403, an enhanced capability module 409, and a processor 405 as described in FIG. 4a.

The reduced capability module 403 supports GAA indoor users, and includes an antenna module 417 that covers e.g., the inside of a building. In an example, these antennas would be configured for a 90-degree horizontal or azimuth beamwidth ($\theta$). The front-end module 415 filters the received/transmitted signal from/to the antenna, and reduces out of bandwidth signals such as interference and noise. The power amplifier module 418 amplifies the signal from the FE module 416 in the transmission mode or amplifies the received signal from 415 in the reception mode. The reduced capability chipset 416 converts the baseband signal from DAC 419 to RF signal in the transmission mode, or converts the RF frequency to baseband in the reception mode. The chipset 417 has "reduced" features relative to the enhanced chipset 429 discussed below, and thus its implementation cost is lower (it is a commodity device that need not be specially fabricated). The A/D-D/A module 419 converts the analog received signal to digital signal in the reception mode or vice versa in the transmission mode.

The enhanced capability module 429 supports PAL outdoor users in the exemplary scenario, and includes a multi-element antenna module 425 that covers outside of the served building or premises. In an example, these antenna elements would be configured as two 65-degree horizontal beam-width elements. The front-end module 423 filters the received/transmitted signal from/to antennas, and reduces out of bandwidth signals such as interference and noise. The power amplifier module 421 amplifies the signal from the FE module 423 in the reception mode or amplifies the signal from the chipset 429 in the transmission mode. The enhanced capability chipset 428 converts the baseband signal to RF signal in the transmission mode or converts the RF frequency to baseband in the reception mode. The enhanced chipset 429 has features not found in the reduced capability chipset such as MIMO/spatial diversity capability, and thus its implementation cost is higher than that of the lower capability chipset 416. The A/D-D/A module 431 converts the analog received signal to digital signal in the reception mode or vice versa in the transmission mode.

The processor module 405 may include a modem 433 for indoor signals, a modem 443 for outdoor signals, a communication module 441, and a network interface module 409. The modem module 433 process the baseband CBRS GAA and/or Wi-Fi signals used in the inside of the building. The modem may include receive and transmit signal processing chains for CBRS LTE (GAA) and WLAN systems which serves the chipset 416. The signal processing in the modem 433 is divided into layers as defined in the 3GPP and IEEE 802.11 specifications; i.e., to support GAA via a first stack 435, and WLAN via a second stack 437.

The modem module 443 process the baseband LTE PAL signals for e.g., use outside the building. The modem 443 may include receive and transmit signal processing chains for CBRS LTE (PAL) which serves the enhanced chipset 429. The signal processing in the modem 443 is divided into layers as defined in the 3GPP standards, via a PAL stack 445. The modems 433 and 443 are communicative with each other and the network interface 409 via the communication module 441, which support e.g., inter-processor communication (IPC) protocols and other network or bus protocols such as PCIe, as desired.

Service Provider Network—

Figure 5A:
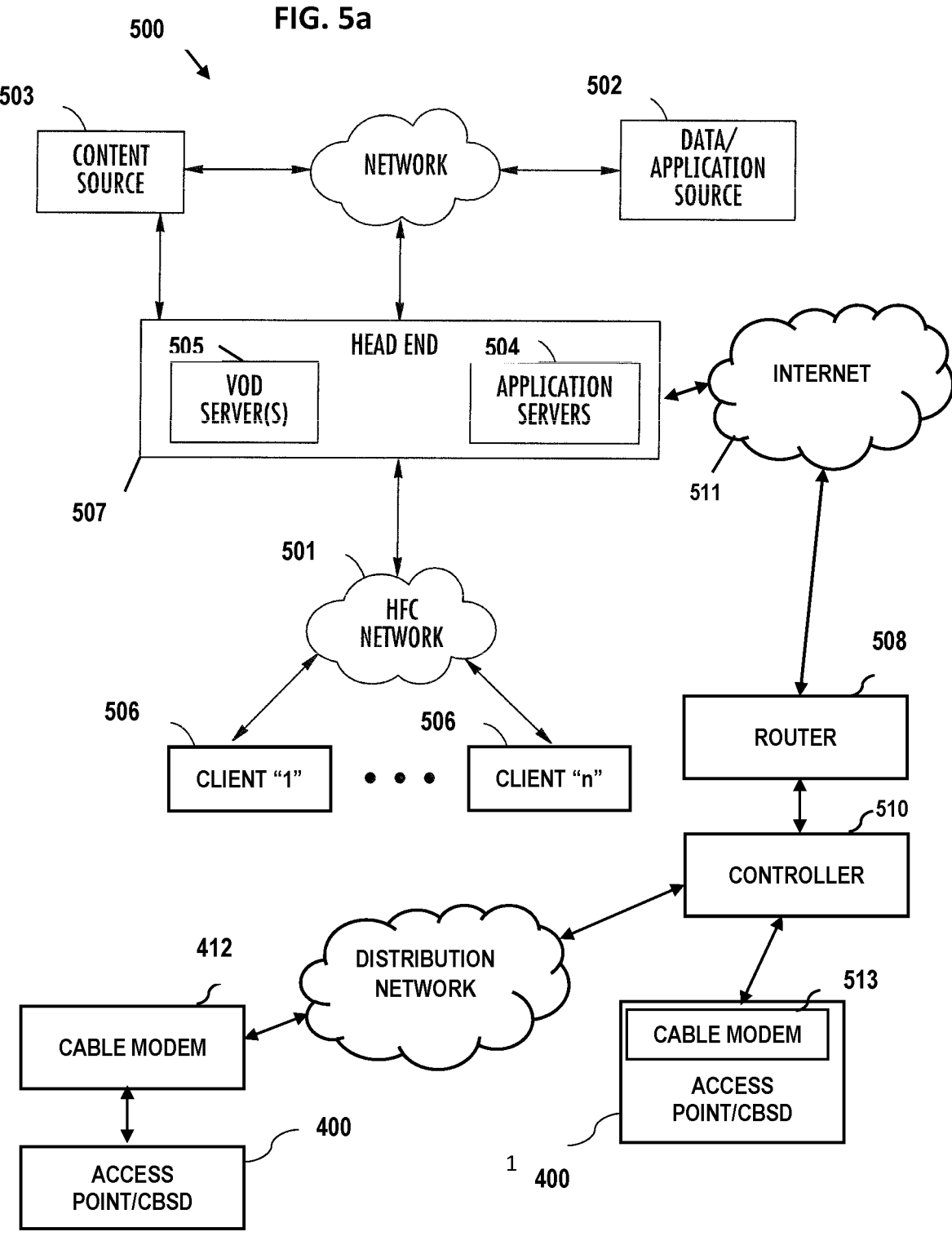
FIG. 5*a* is a functional block diagram illustrating an exemplary hybrid fiber network configuration useful with various aspects of the present disclosure.

FIG. 5a illustrates a typical service provider network configuration useful with the spectrum assignment functionality and supporting CBRS-based wireless network(s) described herein. It will be appreciated that while described with respect to such network configuration, the spectrum assignment and utilization methods and apparatus described herein may readily be used with other network types and topologies, whether wired or wireless, managed or unmanaged.

The exemplary service provider network 500 is used in one embodiment of the disclosure to provide backbone and Internet access from the service provider's wireless access nodes (e.g., CBSD/xNBs, Wi-Fi APs, FWA devices or base stations 400 operated or maintained by the service provider or its customers/subscribers, including cases where the subscriber leases the device for use), one or more stand-alone or embedded cable modems (CMs) 512, 513 in data communication therewith, or even third party access points accessible to the service provider via, e.g., an interposed network such as the Internet 511 (e.g., with appropriate permissions from the access node owner/operator/user). As discussed in greater detail elsewhere herein, the exemplary enhanced CBSD/xNB nodes 400 include the capability of communication with served nodes such as the enhanced CPE 624 discussed infra for, inter alia, more efficient and higher bandwidth service from multiple CBSD/xNB so as to provide better end-user experience.

As described in greater detail subsequently herein with respect to FIG. 6, one or more network controllers 510 are utilized in conjunction with wireless access point (e.g., CBSD)-based controller logic for, inter alia, control of the wireless network access nodes 400 at least partly by the MSO so as to optimize operation of the access point. As opposed to an unmanaged network, the managed service-provider network 500 of FIG. 5a advantageously allows, inter alia, control and management of a given user's access (such user which may be a network subscriber, or merely an incidental/opportunistic user of the service) via the wireless access node(s) 400, including imposition and/or reconfiguration of various access "rules" or other configurations applied to the wireless access nodes.

In some embodiments, the controller logic (whether that on the CBSD/xNB 406 or the network controller 510 or both operating in cooperation) is configured to enforce one or more policies on the operation of the CBSD 400. For instance, in one variant, the logic causes the CBSD to allocate specific user traffic or types of traffic (e.g., that requiring or not requiring QoS or other performance/latency requirements) to either GAA or PAL transmit/receive chains of the CBSD based on such policies. An MSO subscriber for example may be given access to PAL spectrum, whereas a non-subscriber is not. Traffic requiring higher bandwidth (e.g., an HEVC encoded video) than other traffic may be allocated to PAL, since its spatial diversity capability ostensibly affords higher throughput. Likewise, emergency or other priority traffic may be selectively allocated to e.g., PAL.

Moreover, the integrated service provider network architecture 500 allows components at a served premises or venue of interest (e.g., CBSDs, Wi-Fi APs and any supporting infrastructure such as routers, switches, etc.) to be remotely and dynamically reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals by the SAS, or even simply to enhance user experience using one RAT (e.g., CBRS) when another RAT (e.g., WLAN is sub-optimal for whatever reason). It also permits communication of data from the CBSDs backwards towards the controller, including configuration and demand data relating to the individual CBSDs for purposes of facilitating seamless handover.

In certain embodiments, the service provider network 500 also advantageously permits the aggregation and/or analysis of subscriber- or account-specific data (including inter alia, particular CPE/FWA devices 624 or access points 400 associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 507 so as to permit or at least facilitate, among other things, (i) device authentication; (ii) correlation of aspects, use cases or applications to particular subscriber geographics or installation features, such as for logical grouping of access point and/or or CPE/FWA devices of two or more discrete subscribers (or premises thereof) for purposes of e.g., aggregation under a common "host" CBSD/xNB (e.g., a Category B device backhauling the access point), radio path metrics, etc. Moreover, device profiles for particular devices can be maintained by the MSO, such that the MSO (or its automated proxy processes) can model the subscriber-associated device for wireless capabilities, and load/enforce policies between the GAA and PAL portions of the transmit/receive chains as described above.

The CBSD/xNB wireless access nodes 3400 disposed at the service location(s) (e.g., areas, premises or venue(s) of interest) can be coupled to the bearer managed network 500 (FIG. 3a) via, e.g., a cable modem termination system (CMTS) and associated local DOCSIS cable modem (CM) 512, 513, a wireless bearer medium (e.g., a Category B CBSD/xNB, an 802.16 WiMAX, or millimeter wave system—not shown), a fiber-based system such as FiOS or similar, a third-party medium which the managed network operator has access to (which may include any of the foregoing), or yet other means.

The various components of the exemplary embodiment of the network 500 generally include (i) one or more data and application origination sources 502; (ii) one or more content sources 303, (iii) one or more application distribution servers 504; (iv) one or more video-on-demand (VOD) servers 505, (v) client devices 506 (e.g., DSTBs or gateways), (vi) one or more routers 508, (vii) one or more wireless access node controllers 510 (may be placed more locally as shown or in the headend or "core" portion of network), (viii) one or more cable modems 512, 513, and/or (ix) one or more access nodes 400 (which may include 3GPP-compliant EUTRAN eNodeB and/or 5G NR gNodeB functionality in addition to the CBRS-based access point functions, as described elsewhere herein). The application server(s) 504, VOD servers 505 and client device(s) 506 are connected via a bearer (e.g., HFC) network 501. A simple architecture comprising one of each of certain components is shown in FIG. 5a for simplicity, although it will be recognized that comparable architectures with multiple origination sources, distribution servers, VOD servers, controllers, and/or client devices (as well as different network topologies) may be utilized consistent with the present disclosure.

Figure 5B:
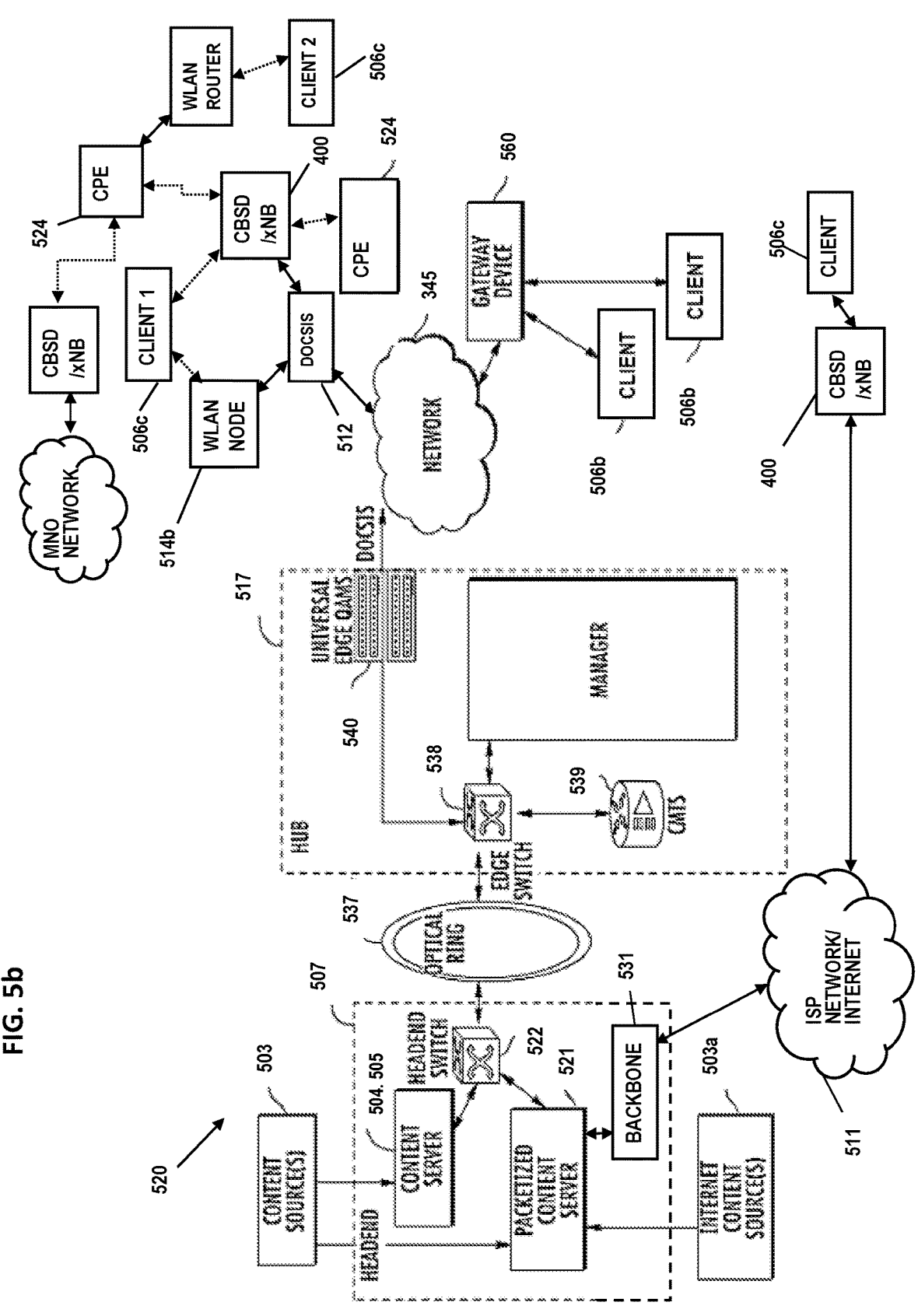
FIG. 5*b* is a functional block diagram of an exemplary packetized content network architecture useful in conjunction with various principles described herein.

FIG. 5b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 5b may deliver Internet data and OTT (over-the-top) services to the end users (including those of the access nodes 400) via the Internet protocol (IP) and TCP, although other protocols and transport mechanisms of the type well known in the digital communication art may be substituted.

The network architecture 520 of FIG. 5b generally includes one or more headends 507 in communication with at least one hub 517 via an optical ring 537. The distribution hub 517 is able to provide content to various user/client devices 506, and gateway devices 560 as applicable, via an interposed network infrastructure 545. The illustrated CPE/FWA 524 includes in one implementation an outdoor Fixed Wireless Access (FWA) application of CBRS.

In one exemplary content delivery paradigm, MPEG-based video content (e.g., MPEG-2, H.264/AVC or H.265/HEVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 512 (including to end users of the CBSD/xNB access node 400). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 512 and associated end-user devices 506a, 506b of the implementation of FIG. 5b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 539. The CMTS examines the packets, and forwards packets intended for the local network to the edge switch. Other packets are in one variant discarded or routed to another component.

In one implementation, the CM 512 shown in FIG. 5b services an area which may include a prescribed premises or venue, such as an apartment building, conference center or hospitality structure (e.g., hotel). In parallel (or in the alternative), the premises includes one or more CPE/FWA nodes 524 for CBRS-band (3.5 GHz) access, and a WLAN (e.g., Wi-Fi) node 514b for WLAN access (e.g., within 2.4 GHz ISM band), or a 3GPP small cell or femtocell. The CPE/FWA 524 may also provide connectivity for a WLAN router as shown (i.e., the CPE/FWA acting as a radio head for attached router which provides more localized WLAN services to portions of the premises), which provides e.g., Wi-Fi access for users at the premises. The CPE/FWA 524 may also communicate wirelessly with non-MSO CBSD/xNB devices 400 operated by e.g., an MNO for backhaul via that MNO's infrastructure, as shown at the top of FIG. 5b. Notably, in some configurations, the client devices 506c communicating with the access nodes 400 as described in greater detail subsequently herein, can utilize either RAT (CBRS/3GPP with the CBSD/xNB or WLAN). In one variant, this selective utilization may depend on, inter alia, directives received from the MSO controller 510 (FIG. 5a) via one access node 400 or the other, or even indigenous logic on the client device 506c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 531 and other network components can be used to deliver packetized content to the user's mobile client device 506c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 511 (e.g., at a local coffee shop, via a Wi-Fi AP connected to the coffee shop's ISP via a modem, with the user's IP-enabled end-user device 506c utilizing an Internet browser or MSO/third-party app to stream content according to an HTTP-based approach) via the access point 400.

Wireless Services Architecture—

FIG. 6 illustrates an exemplary embodiment of a network architecture 600 useful in implementing the CBSD/xNB functionality according to the present disclosure. As used in the present context, the term "users" may include without limitation end users (e.g., individuals, whether subscribers of the MSO network, the MNO network, or other), the receiving and distribution equipment or infrastructure such as the access point 400 or CPE/FWA 524, venue operators, third party service providers, or even entities within the MSO itself (e.g., a particular department, system or processing entity).

It will be appreciated that while described primarily in terms of CBSD/xNBs 400 which also include EUTRAN (3GPP) compliant eNodeB and/or gNodeB functionality, the latter is by no means of requirement of practicing the broader features of the invention, and in fact non-3GPP signaling and protocols (e.g., 3GPP2, IEEE Std. 802.16, etc.) may be utilized to support the various functions described herein (including as the underlying air interface technology for the GAA and PAL sectors and transmit/receive chains of the access point). Due to its current ubiquity (especially in mobile devices or UEs), however, the extant 3GPP protocols provide a convenient and effective platform which can be leveraged for CBRS-based operation. Moreover, the various aspects of the disclosure are not limited to CBRS-based frequencies or infrastructure, but rather may conceivably be applied to any fixed architecture wireless system with multiple transmitters and receivers.

As shown, the illustrated embodiment of the architecture may generally include if desired an MSO-maintained CBRS controller 510 (which may be disposed remotely at the backend or headend of the system within the MSO domain as shown or at the served venue, or at an intermediary site), a CBRS Core/Neutral Host/Private Network Controller 612, an analytics engine 613 in data communication with the CBRS controller 510, an MSO-maintained subscriber and CBRS database 604, multiple CBSD/xNB access nodes 400 in data communication with the CBRS controller 510 (e.g., via existing network architectures including any wired or wireless connection), as well as any number of CPE/FWA devices 524, and other client devices 506c (smartphones, laptops, tablets, watches, vehicles, etc.). The CBSD/xNB 400 includes in the illustrated embodiment an embedded cable modem 512 used for communication with a corresponding CMTS 539 (FIG. 5b) within the MSO's (e.g., cable) plant 500 via cable power and backhaul infrastructure 606, including high-data bandwidth connections to the MSO's backbone 531, and electrical power for the CBSD/xNB if required. A MNO (mobile network operator) network 611 also may communicate with the MSO network via the backhaul 606, such as for inter-operator communications regarding common users/subscribers.

The presence of the MSO analytics engine 613 is optional for purposes of implementing the methodologies and functions described herein; certain analytics functions may be performed by the MSO analytics engine in support of efficient frequency management and utilization (including mitigation of session disruption due to e.g., SAS-initiated spectrum withdrawals), depending on inter alia, the degree of integration between the cognizant SAS/DP and the MSO desired. For example, in one implementation, certain sets of rules or priorities may be implemented at the MSO level via logic on the network controller 510 and analytics engine 613 which are not visible to the SAS (the SAS being largely agnostic to particulars of each MSO/MNO domain which it serves). As such, the SAS (or DP) may provide the MSO domain with higher-level instructions or directives on frequency/carrier use, reclamation, time periods, etc., and effectively let the MSO domain decide how to execute the process consistent with those instructions or directives. These instructions/directives may subsequently be utilized by the network controller 510 in evaluating and selecting frequency allocations for various devices during one or more TDD slots.

It will be appreciated that while a single network controller entity 510 is shown in FIG. 4, the architecture may in fact include two or more such controllers, each allocated (whether statically or dynamically) to a subset of the access nodes 400 of the network.

As shown in FIG. 6, in operation, the Domain Proxy (DP) 608 is in logical communication with the CBSD/xNB 400 disposed at the premises or venue (either directly, as shown, or via MSO backend network infrastructure) and the MSO CBRS network controller entity 510. The DP 608 provides, inter alia, SAS interface for the CBSD/xNB, including directive translation between CBSD/xNB and SAS commands, bulk CBSD/xNB directive processing, and interference contribution reporting to the SAS (i.e., to help an SAS tune or update its predictive propagation models and detect realistic interference issues once CBSDs/xNBs are deployed, the CBSDs/xNBs and even attached CPE/FWA 524 can provide signal strength, phase/timing, and interference level measurements, in addition to or as part of those provided to the network controller 510 as part of the CBSD/xNB/beam/slot allocations described in greater detail elsewhere herein).

The MSO network controller entity 510 (or entities) in the illustrated embodiment communicates with the DP 608 via an MSO CBRS access network 610, which may be a public internetwork (e.g., the Internet), private network, or other, depending on any security and reliability requirements mandated by the MSO and/or SAS.

Figure 6A:
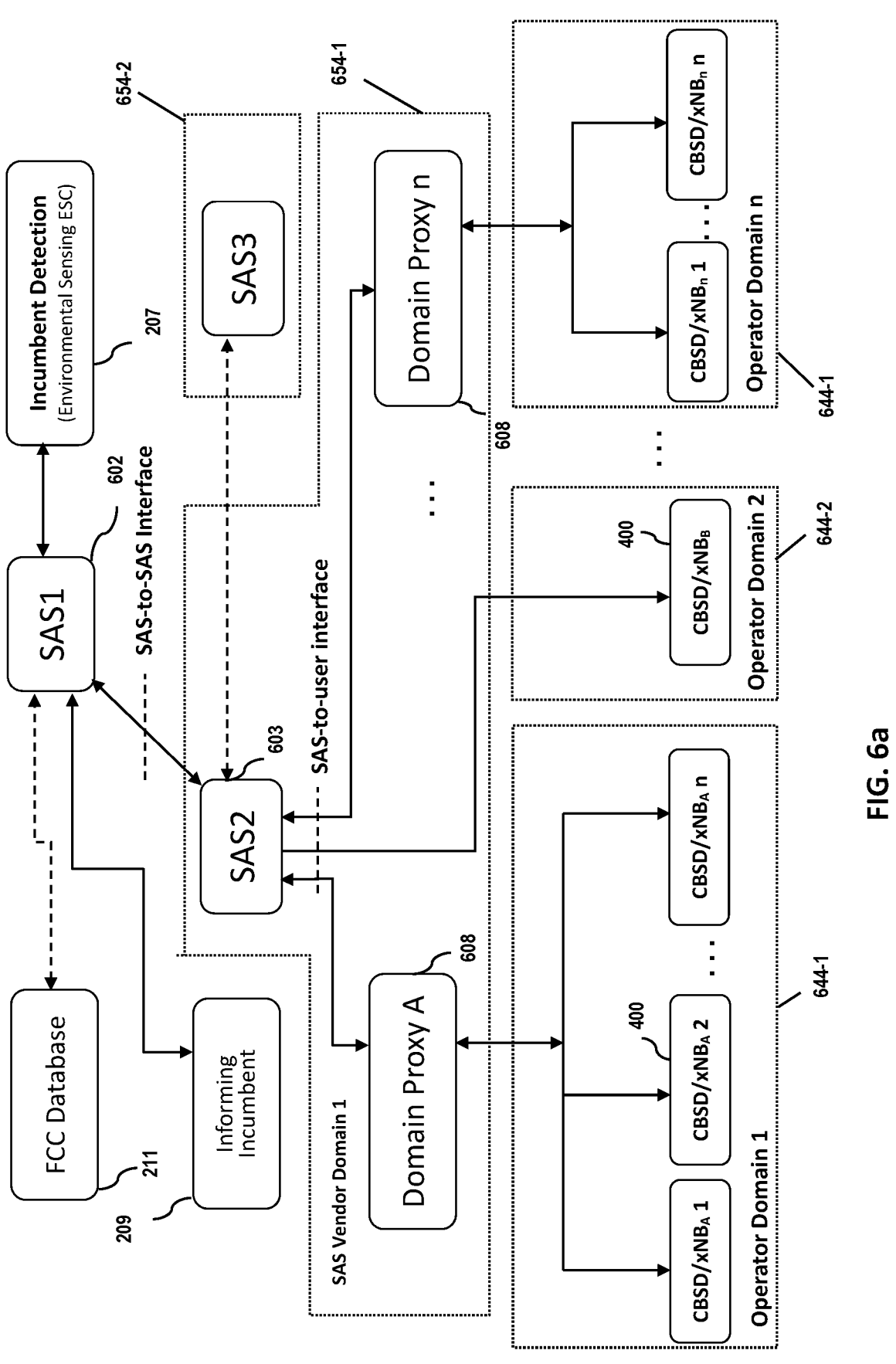
FIG. 6*a* is a functional block diagram of a first exemplary implementation of the quasi-licensed wireless network architecture of FIG. 6, including operator domains and SAS vendor domains.

As used herein, a CBRS "domain" is defined is any collection of CBSDs/xNBs 400 that are or need to be grouped for management, whether logically or by other scheme; e.g.: according to network operator (NO), according to a serving SAS vendor, by radio path propagation characteristics, and/or by physical disposition (e.g., within a large enterprise, venues, certain geographic area, etc.) In the embodiment of FIG. 6, the DP 608 aggregate control information flows to the SAS1 602 and/or any participating other SAS (SAS2), which may be e.g., a Commercial SAS (CSAS)) 603, and generates performance reports, channel requests, heartbeats, and other types of data, including data necessary for operation of the spectrum allocation and reassignment algorithms described in greater detail subsequently herein. In the illustrated embodiment, the DP 608 is operated by a third-party service provider, although it will be appreciated that the MSO may operate and maintain the DP 608, and or operate/maintain its own internal DP, such as for channel request processing, aggregation, reporting, and other of the above-listed functions for the MSO's internal CBRS domains, for interface with an external DP 608. FIGS. 6a and 6b illustrate exemplary alternate configurations of SAS1 602, SAS2 603, and DPs 608 useful with the various embodiments of the methodologies and apparatus described herein. It will be appreciated that these configurations are intended merely to illustrate operation of the aforementioned methods and apparatus of the present disclosure, and should in no way be considered limiting. Adaptation of the methods and apparatus described herein to yet other types of configurations (including non-CBRS applications) can be accomplished by those of ordinary skill when provided the present disclosure.

As shown in FIG. 6a, multiple operator domains 644 are serviced by respective CBSDs/xNBs 400. Two domains 644-1 of the three operator domains are served by respective DPs 608 within a first SAS vendor domain 654-1. The two DPs 608 are served by a common SAS (SAS2 603), which interfaces with the SAS1 602 outside the domain 654-1 as illustrated. The third operator domain 644-2 is directly served by the SAS3 603, with no DP (e.g., this domain 644-2 may for example include its own internal DP, or has otherwise obviated the functions thereof).

Figure 6B:
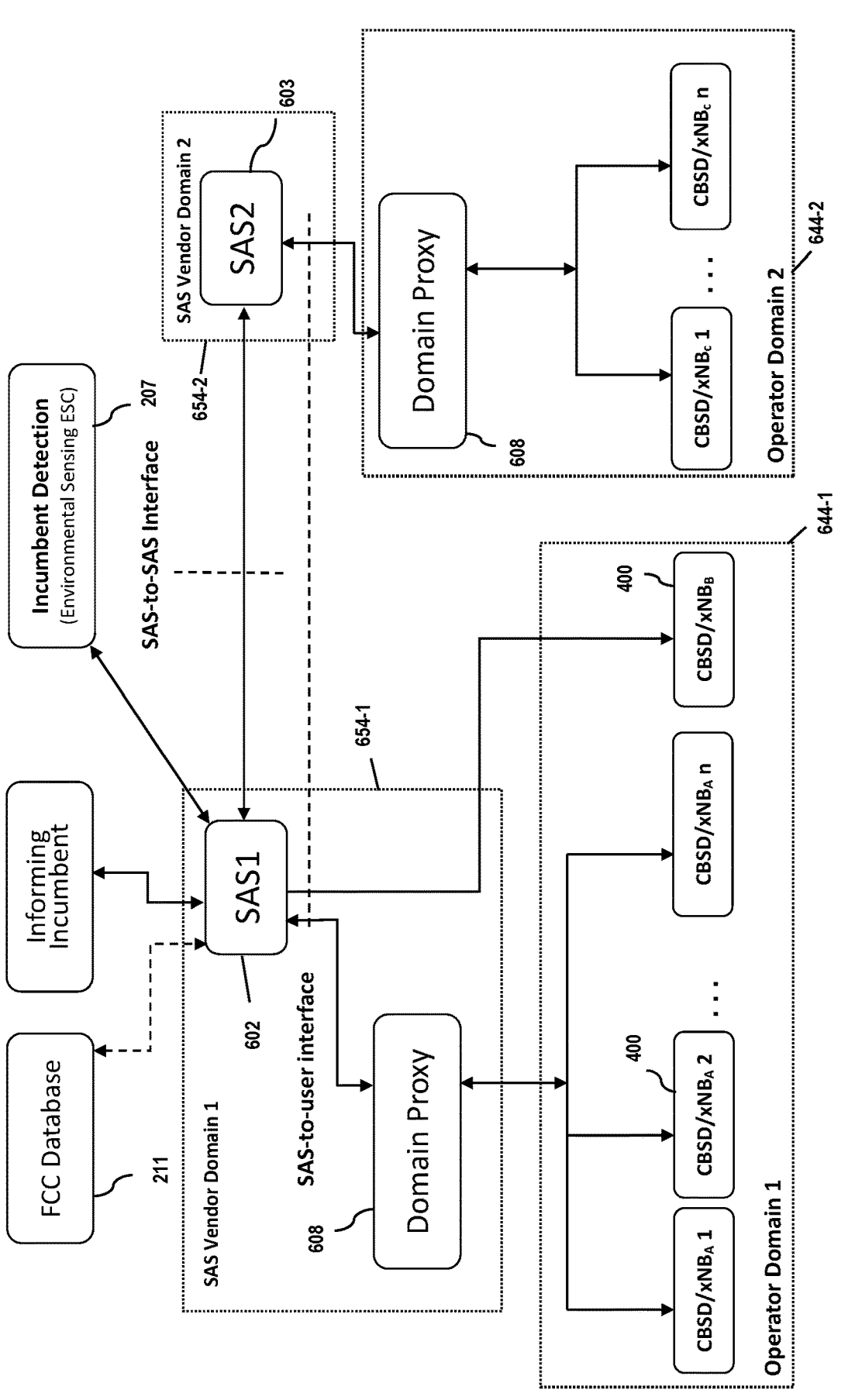
FIG. 6*b* is a functional block diagram of a second exemplary implementation of the quasi-licensed wireless network architecture of FIG. 6, including operator domains and SAS vendor domains.

Referring now to FIG. 6b, multiple operator domains 644 are again serviced by respective CBSDs/xNBs 614. One of the two operator domains 644-1 are served by respective DPs 608 within respective SAS vendor domains 654-1 and 654-2. The two DPs 608 are served by different SAS; e.g., SAS1 602 for the first domain 654-1, which interfaces with incumbent detection apparatus 207 and the FCC database 211 (as well as informing incumbents) as illustrated. The second operator domain 644-2 and its DP 608 are served by SAS2 603 within vendor domain 654-2.

Methods—

Methods for providing inside-outside coverage (e.g., CBRS GAA and PAL) coverage according to the present disclosure are now described with respect to FIG. 7.

Referring now to FIG. 5, one embodiment of the general methodology 700 of CBSD/xNBs inside-outside coverage so as to assign users to GAA and PAL spectrum, with reference to the exemplary CBSD/xNBs 400 of FIGS. 4a-4c, is described.

At step 703 of the method 500, the CBSD/xNB powers up, and registers to the cognizant DP or SAS (depending on configuration) per step 705.

Per step 707, the SAS (or DP) checks for the availability of GAA spectrum band, and based on the availability may assign one or more carrier(s) to the GAA users (step 709). For example, in one variant, the CBSD 400 is configured to utilize its SDR capability to retune its transceiver(s) for the indoor chain to designated one or more GAA spectrum carrier(s).

At step 711, the GAA users are processed by the reduced capability module 03 with reference to FIGS. 4a4c.

At step 713 of the method 700, the CBSD/xNB 400 via the SAS/DP, checks for the availability of PAL spectrum, and based on the availability may assign one or more carrier (s) to the PAL users (step 715). At step 717, the PAL users are processed by the enhanced capability module 409 of the CBSD 400.

Conversely, if per step 713 there is no PAL spectrum available (recall that PAL is allocated to licensed users, and only when unoccupied by such users may it be granted for use to other "general" entities), then per steps 712 and 714 the controller logic 406 assigns the enhanced transceiver chain 409 to GAA spectrum, whether the same or different carriers than that used for the GAA assignment of step 709, in an effort to at least provide some level of (outdoor) service.

It will be appreciated that while substitution of GAA for PAL spectrum when the latter is not available is but one possible logical construct that may be used by the controller logic 406 of the access point 400. For instance, in another variant, the logic may simply utilize a try-and-wait scheme for obtaining PAL, in effect recursively attempting to obtain a PAL spectrum grant via the DP or SAS until successful.

As another alternative, the logic may be configured to determine first whether PAL spectrum is available, and then based thereon, either allocate PAL to one transceiver chain or allocate GAA to both chains.

As yet another alternative, the presence of certain types or classes of users or traffic may be used as a predicate for checking particular spectrum type availability. For instance, if no outdoor users are present, the logic 406 may obviate any request to the DP/SAS for PAL, and simply utilize GAA for the (indoor) transceiver chain.

It will further be appreciated that a given user (e.g., UE or mobile CPE) may transfer from one region or domain to another, such as by walking from indoors to outdoors at the served premises. Accordingly, the present disclosure contemplates such use cases may be handled by, inter alia, handover by the CBSD/xNB 400 between GAA and PAL. For instance, in one exemplary method, the moving user moves out of the coverage lobe 327 of the antenna apparatus 300 (see FIG. 3a) and into a PAL lobe 323, 325. The extant higher layer communication session is maintained for a period of time while the first transceiver chain alerts the higher layer logic (e.g., controller or connection manager 406) that the first PHY is inoperative; i.e., insufficient signal strength or RSSI or other parameter, and the connection (e.g., 3GPP connection) is terminated while a new connection is established (e.g., via 3GPP procedures of search/acquisition, RACH, etc.) on the PAL carrier once authentication/authorization is complete. For instance, a user moving their restaurant seat from indoor to outdoor can maintain a common communications session without "dropping."

Additionally, certain scenarios may occur wherein a SAS withdraws a grant for GAA or PAL (or both). In such cases, the exemplary methods and apparatus for effectuating "seamless' frequency reassignment within quasi-licensed networks may be used consistent with the present disclosure (described in co-owned and co-pending U.S. patent application Ser. No. 16/427,186 filed May 30, 2019 and entitled "METHODS AND APPARATUS FOR FREQUENCY TRANSITION MANAGEMENT IN A QUASI-LICENSED WIRELESS SYSTEM," which is incorporated herein by reference in its entirety).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

LTE frequency bands - TS 36.101 (Rel. 14 Jun. 2017)

| Band | Name | Downlink (MHz) Low | Middle EARFCN[1] | High | Bandwidth DL/UL (MHz) | Uplink (MHz) Low | Middle EARFCN | High | Duplex spacing (MHz) | Equivalent UMTS band |
|---|---|---|---|---|---|---|---|---|---|---|
| 1 | 2100 | 2110 | 2140 | 2170 | 60 | 1920 | 1950 | 1980 | 190 | 1 |
| | | 0 | 300 | 599 | | 18000 | 18300 | 18599 | | |
| 2 | 1900 PCS | 1930 | 1960 | 1990 | 60 | 1850 | 1880 | 1910 | 80 | 2 |
| | | 600 | 900 | 1199 | | 18600 | 18900 | 19199 | | |
| 3 | 1800+ | 1805 | 1842.5 | 1880 | 75 | 1710 | 1747.5 | 1785 | 95 | 3 |
| | | 1200 | 1575 | 1949 | | 19200 | 19575 | 19949 | | |
| 4 | AWS-1 | 2110 | 2132.5 | 2155 | 45 | 1710 | 1732.5 | 1755 | 400 | 4 |
| | | 1950 | 2175 | 2399 | | 19950 | 20175 | 20399 | | |
| 5 | 850 | 869 | 881.5 | 894 | 25 | 824 | 836.5 | 849 | 45 | 5 |
| | | 2400 | 2525 | 2649 | | 20400 | 20525 | 20649 | | |
| 6 | UMTS only | 875 | 880 | 885 | 10 | 830 | 835 | 840 | 45 | 6 |
| | | 2650 | 2700 | 2749 | | 20650 | 20700 | 20749 | | |
| 7 | 2600 | 2620 | 2655 | 2690 | 70 | 2500 | 2535 | 2570 | 120 | 7 |
| | | 2750 | 3100 | 3449 | | 20750 | 21100 | 21449 | | |
| 8 | 900 GSM | 925 | 942.5 | 960 | 35 | 880 | 897.5 | 915 | 45 | 8 |
| | | 3450 | 3625 | 3799 | | 21450 | 21625 | 21799 | | |
| 9 | 1800 | 1844.9 | 1862.4 | 1879.9 | 35 | 1749.9 | 1767.4 | 1784.9 | 95 | 9 |
| | | 3800 | 3975 | 4149 | | 21800 | 21975 | 22149 | | |
| 10 | AWS-1+ | 2110 | 2140 | 2170 | 60 | 1710 | 1740 | 1770 | 400 | 10 |
| | | 4150 | 4450 | 4749 | | 22150 | 22450 | 22749 | | |
| 11 | 1500 Lower | 1475.9 | 1485.9 | 1495.9 | 20 | 1427.9 | 1437.9 | 1447.9 | 48 | 11 |
| | | 4750 | 4850 | 4949 | | 22750 | 22850 | 22949 | | |
| 12 | 700 a | 729 | 737.5 | 746 | 17 | 699 | 707.5 | 716 | 30 | 12 |
| | | 5010 | 5095 | 5179 | | 23010 | 23095 | 23179 | | |
| 13 | 700 c | 746 | 751 | 756 | 10 | 777 | 782 | 787 | −31 | 13 |
| | | 5180 | 5230 | 5279 | | 23180 | 23230 | 23279 | | |
| 14 | 700 PS | 758 | 763 | 768 | 10 | 788 | 793 | 798 | −30 | 14 |
| | | 5280 | 5330 | 5379 | | 23280 | 23330 | 23379 | | |
| 17 | 700 b | 734 | 740 | 746 | 12 | 704 | 710 | 716 | 30 | |
| | | 5730 | 5790 | 5849 | | 23730 | 23790 | 23849 | | |
| 18 | 800 Lower | 860 | 867.5 | 875 | 15 | 815 | 822.5 | 830 | 45 | |
| | | 5850 | 5925 | 5999 | | 23850 | 23925 | 23999 | | |
| 19 | 800 Upper | 875 | 882.5 | 890 | 15 | 830 | 837.5 | 845 | 45 | 19 |
| | | 6000 | 6075 | 6149 | | 24000 | 24075 | 24149 | | |
| 20 | 800 DD | 791 | 806 | 821 | 30 | 832 | 847 | 862 | −41 | 20 |
| | | 6150 | 6300 | 6449 | | 24150 | 24300 | 24449 | | |
| 21 | 1500 Upper | 1495.9 | 1503.4 | 1510.9 | 15 | 1447.9 | 1455.4 | 1462.9 | 48 | 21 |
| | | 6450 | 6525 | 6599 | | 24450 | 24525 | 24599 | | |
| 22 | 3500 | 3510 | 3550 | 3590 | 80 | 3410 | 3450 | 3490 | 100 | 22 |
| | | 6600 | 7000 | 7399 | | 24600 | 25000 | 25399 | | |
| 23 | 2000 S-band | 2180 | 2190 | 2200 | 20 | 2000 | 2010 | 2020 | 180 | |
| | | 7500 | 7600 | 7699 | | 25500 | 25600 | 25699 | | |
| 24 | 1600 L-band | 1525 | 1542 | 1559 | 34 | 1626.5 | 1643.5 | 1660.5 | −101.5 | |
| | | 7700 | 7870 | 8039 | | 25700 | 25870 | 26039 | | |
| 25 | 1900+ | 1930 | 1962.5 | 1995 | 65 | 1850 | 1882.5 | 1915 | 80 | 25 |
| | | 8040 | 8365 | 8689 | | 26040 | 26365 | 26689 | | |
| 26 | 850+ | 859 | 876.5 | 894 | 35 | 814 | 831.5 | 849 | 45 | 26 |
| | | 8690 | 8865 | 9039 | | 26690 | 26865 | 27039 | | |
| 27 | 800 SMR | 852 | 860.5 | 869 | 17 | 807 | 815.5 | 824 | 45 | |
| | | 9040 | 9125 | 9209 | | 27040 | 27125 | 27209 | | |
| 28 | 700 APT | 758 | 780.5 | 803 | 45 | 703 | 725.5 | 748 | 55 | |
| | | 9210 | 9435 | 9659 | | 27210 | 27435 | 27659 | | |
| 29 | 700 d | 717 | 722.5 | 728 | 11 | Downlink only | | | | |
| | | 9660 | 9715 | 9769 | | | | | | |
| 30 | 2300 WCS | 2350 | 2355 | 2360 | 10 | 2305 | 2310 | 2315 | 45 | |
| | | 9770 | 9820 | 9869 | | 27660 | 27710 | 27759 | | |
| 31 | 450 | 462.5 | 465 | 467.5 | 5 | 452.5 | 455 | 457.5 | 10 | |
| | | 9870 | 9895 | 9919 | | 27760 | 27785 | 27809 | | |
| 32 | 1500 L-band | 1452 | 1474 | 1496 | 44 | Downlink only | | | | 32 |
| | | 9920 | 10140 | 10359 | | | | | | |
| 65 | 2100+ | 2110 | 2155 | 2200 | 90 | 1920 | 1965 | 2010 | 190 | |
| | | 65536 | 65986 | 66435 | | 131072 | 131522 | 131971 | | |
| 66 | AWS-3 | 2110 | 2155 | 2200 | 90/70 | 1710 | 1745 | 1780 | 400 | |
| | | 66436 | 66886 | 67335 | | 131972 | 132322 | 132671 | | |
| 67 | 700 EU | 738 | 748 | 758 | 20 | Downlink only | | | | |
| | | 67336 | 67436 | 67535 | | | | | | |
| 68 | 700 ME | 753 | 768 | 783 | 30 | 698 | 713 | 728 | 55 | |
| | | 67536 | 67686 | 67835 | | 132672 | 132822 | 132971 | | |
| 69 | 2500 | 2570 | 2595 | 2620 | 50 | Downlink only | | | | |
| | | 67836 | 68086 | 68335 | | | | | | |
| 70 | AWS-4 | 1995 | 2007.5 | 2020 | 25/15 | 1695 | 1702.5 | 1710 | 300 | |
| | | 68336 | 68461 | 68585 | | 132972 | 133047 | 133121 | | |

APPENDIX I-continued

| Band | Name | Downlink (MHz) Low Middle High EARFCN[1] | | | Bandwidth DL/UL (MHz) | Uplink (MHz) Low Middle High EARFCN | | | Duplex spacing (MHz) | Equivalent UMTS band |
|------|------|------|------|------|------|------|------|------|------|------|
| LTE frequency bands - TS 36.101 (Rel. 14 Jun. 2017) | | | | | | | | | | |
| 252 | Unlicensed NII-1 | 5150 255144 | 5200 255644 | 5250 256143 | 100 | Downlink only | | | | |
| 255 | Unlicensed NII-3 | 5725 260894 | 5787.5 261519 | 5850 262143 | 125 | Downlink only | | | | |
| TDD | | | | | | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TDPCS Lower | 1850 36350 | 1880 36650 | 1910 36949 | 60 | | | | | B(lo) |
| 36 | TDPCS Upper | 1930 36950 | 1960 37250 | 1990 37549 | 60 | | | | | B(hi) |
| 37 | TDPCS Center gap | 1910 37550 | 1920 37650 | 1930 37749 | 20 | | | | | C |
| 38 | TD 2600 | 2570 37750 | 2595 38000 | 2620 38249 | 50 | | | | | D |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

[1]EUTRA Absolute RF Channel Number

What is claimed is:

1. Computer readable apparatus comprising non-transitory storage medium, the non-transitory storage medium comprising at least one computer program comprising a plurality of instructions which are configured to, when executed on a digital processor apparatus of a computerized wireless access apparatus, cause the computerized wireless access apparatus to:

obtain first data relating to a first RF (radio frequency) carrier within a first type of frequency band;

obtain second data relating to a second RF carrier within a second type of frequency band;

cause a first modem of the computerized wireless access apparatus to use the first RF carrier based on the first data, the use of the first RF carrier comprising use via a first antenna element of a plurality of antenna elements of the computerized wireless access apparatus; and cause a second modem of the computerized wireless access apparatus to use the second RF carrier based on the first data, the use of the second RF carrier comprising use via at least one second antenna element of the plurality of antenna elements of the computerized wireless access apparatus;

wherein the first antenna element provides coverage for indoor applications and the at least one second antenna element provides coverage for outdoor applications, each with tailored transmission parameters.

2. The computer readable apparatus of claim 1, wherein the computerized wireless access apparatus comprises a distributed unit (DU) of a 5G NR gNB.

3. The computer readable apparatus of claim 1, wherein the computerized wireless access apparatus comprises a Category A device which operates at or below a 1 W Federal Communications Commission (FCC) limit.

4. The computer readable apparatus of claim 1, wherein the computerized wireless access apparatus comprises a Category B Citizens Broadband Radio Service device (CBSD) that also includes a 3rd Generation Partnership Project (3GPP) 4G/4.5/5G protocol stack.

5. The computer readable apparatus of claim 1 wherein: the two (2) of the three (3) antenna elements allocated to the one licensed quasi-licensed band comprise priority access license (PAL) elements each having a first prescribed azimuth coverage, and the one of the three (3) antenna elements allocated to the non-licensed quasi-licensed band comprises a general authorized access (GAA) element having a larger azimuth coverage than the PAL elements; and a central radiation axis of each of the PAL elements and GAA element is adjustable so as to enable different patterns of coverage by the PAL elements and GAA element in combination.

6. The computer readable apparatus of claim 1, wherein the computerized wireless access apparatus comprises a fixed wireless access (FWA) apparatus operated by a network operator of a managed network, the FWA apparatus configured to communicate wirelessly with one or more Citizens Broadband Radio Service device (CBSD) or xNB devices to obtain wireless backhaul from a premises for use within a wireless network.

7. A computerized wireless access apparatus for use within a network, the computerized wireless access apparatus comprising:
a digital processor apparatus;
a first wireless modem chipset in data communication with the digital processor apparatus;
a second wireless modem chipset in data communication with the digital processor apparatus;
network interface apparatus in data communication with the digital processor apparatus; and
a storage apparatus in data communication with the digital processor apparatus and comprising at least one computer program, the at least one computer program comprising a plurality of instructions which are configured to, when executed on the digital processor apparatus, cause the computerized wireless access apparatus to:
obtain first data relating to a first RF (radio frequency) carrier within a first type of frequency band;
obtain second data relating to a second RF carrier within a second type of frequency band;
cause the first wireless modem chipset of the computerized wireless access apparatus to use the first RF carrier based on the first data, the use of the first RF carrier comprising use via a first antenna element of a plurality of antenna elements of the computerized wireless access apparatus; and
cause the second wireless modem chipset of the computerized wireless access apparatus to use the second RF carrier based on the first data, the use of the second RF carrier comprising use via at least one second antenna element of the plurality of antenna elements of the computerized wireless access apparatus;
wherein the first and second wireless modem chipsets configured to operate contemporaneously to provide differentiated services to at least two different user classes.

8. The computerized wireless access apparatus of claim 7, wherein:
the first data is generated based at least in part on data received from one of a Citizens Broadband Radio Service (CBRS) spectrum access system (SAS) or a domain proxy (DP) indicating availability of the first RF carrier within a general authorized access (GAA) quasi-licensed band; and
the second data is generated based at least in part on data received from one of the CBRS SAS or the DP indicating an availability of the second RF carrier within a priority access license (PAL) quasi-licensed band.

9. The computerized wireless access apparatus of claim 7, wherein:
the first antenna element is configured to radiate within a first azimuth value;
the at least one second antenna element comprises two antenna elements each configured to radiate within a second azimuth value smaller than the first azimuth value;

the causation of the first wireless modem chipset of the computerized wireless access point apparatus to use the first RF carrier via the first antenna element comprises causation of radiation from the first antenna element via the first RF carrier within the first azimuth value; and
the causation of the second wireless modem chipset of the computerized wireless access point apparatus to use the second RF carrier via the at least one second antenna element comprises causation of radiation from the two antenna elements via the second RF carrier within the second azimuth value, the radiation from the first antenna element and the two antenna elements being simultaneous and substantially non-overlapping in at least azimuth.

10. The computerized wireless access apparatus of claim 9, wherein:
the causation of the radiation from the first antenna element via the first RF carrier within the first azimuth value comprises causation of radiation within a first azimuthal displacement or range associated with a first application; and
the causation of the radiation from the two antenna elements via the second RF carrier within the second azimuth value comprises causation of radiation within a second azimuthal displacement or range associated with a second application different than the first application.

11. A computerized method of operating a wireless access point, the computerized method comprising:
obtaining first data comprising data relating to a first RF (radio frequency) carrier within a first type of frequency band;
obtaining second data comprising data relating to a second RF carrier within a second type of frequency band;
causing a first modem of the wireless access point to use the first RF carrier based on the first data, the use of the first RF carrier comprising use via a first antenna element of a plurality of antenna elements of the wireless access point, the first antenna element configured to radiate within a first azimuth value, the causing the first modem of the wireless access point to use the first RF carrier via the first antenna element comprises causing radiation from the first antenna element via the first RF carrier within the first azimuth value; and
causing a second modem of the wireless access point to use the second RF carrier based on the first data, the use of the second RF carrier comprising use via at least one second antenna element of the plurality of antenna elements of the wireless access point, the at least one second antenna element comprising two antenna elements each configured to radiate within a second azimuth value smaller than the first azimuth value, the causing the second modem of the wireless access point to use the second RF carrier via the at least one second antenna element comprises causing radiation from the two antenna elements via the second RF carrier within the second azimuth value.

12. The computerized method of claim 11, wherein the radiation from the first antenna element and the two antenna elements are simultaneous and substantially non-overlapping in at least azimuth.

13. The computerized method of claim 11, wherein:
the first data is generated based at least in part on data received from one of a Citizens Broadband Radio Service (CBRS) spectrum access system (SAS) or a domain proxy (DP) indicating availability of the first RF carrier within a general authorized access (GAA) quasi-licensed band; and the second data is generated based at least in part on data received from one of the CBRS SAS or the DP indicating an availability of the second RF carrier within a priority access license (PAL) quasi-licensed band.

14. The computerized method of claim 13, wherein both the first and second RF carriers each have a frequency between 3.550 and 3.700 GHz inclusive.

15. The computerized method of claim 11, wherein:

the causing of the radiation from the first antenna element via the first RF carrier within the first azimuth value comprises causing radiation within a first azimuthal displacement or range associated with a first application; and the causing of the radiation from the two antenna elements via the second RF carrier within the second azimuth value comprises causing radiation within a second azimuthal displacement or range associated with a second application different than the first application.

16. The computerized method of claim 15, wherein the first application comprises a user application substantially within a building or structure; and the second application comprises an application substantially outside of the building or the structure.

17. The computerized method of claim 16, further comprising backhauling data to and from the wireless access point via a wireline radio frequency (RF) modem, the wireline RF modem communicating with a core or headend computerized entity of a managed service provider network, the wireless access point deployed by an operator of the managed service provider network at a premises served by the wireless access point, the premises comprising the building or the structure.

18. The computerized method of claim 11, further comprising backhauling data to and from the wireless access point via a wireline radio frequency modem, the wireline radio frequency modem communicating with a core or headend computerized entity of a managed service provider network, the wireless access point deployed by an operator of the managed service provider network.

19. The computerized method of claim 11, further comprising positioning the wireless access point relative to an interface between two desired coverage areas, a first of the two desired coverage areas associated with a first type of application, and a second of the two desired coverage areas associated with a second type of application, such that the first antenna element services the first of the two desired coverage areas using only the first type of frequency band, and the at least one second antenna element services the second of the two desired coverage areas using only the second type of frequency band.

20. Computer readable apparatus comprising non-transitory storage medium, the non-transitory storage medium comprising at least one computer program comprising a plurality of instructions which are configured to, when executed on a digital processor apparatus of a computerized wireless access apparatus, cause the computerized wireless access apparatus to:

obtain first data relating to a first RF (radio frequency) carrier within a first type of frequency band;

obtain second data relating to a second RF carrier within a second type of frequency band;

cause a first modem of the computerized wireless access apparatus to use the first RF carrier based on the first data, the use of the first RF carrier comprising use via a first antenna element of a plurality of antenna elements of the computerized wireless access apparatus, the plurality of antenna elements comprises three (3) antenna elements each configured to operate within a prescribed frequency band, the first antenna element of the plurality of antenna elements comprises one of the three (3) antenna elements allocated to a non-licensed quasi-licensed band; and cause a second modem of the computerized wireless access apparatus to use the second RF carrier based on the first data, the use of the second RF carrier comprising use via at least one second antenna element of the plurality of antenna elements of the computerized wireless access apparatus, the at least one second antenna element of the plurality of antenna elements comprise two (2) of the three (3) antenna elements allocated to one licensed quasi-licensed band.

* * * * *